US012445335B2

(12) United States Patent
Hosseini et al.

(10) Patent No.: US 12,445,335 B2
(45) Date of Patent: Oct. 14, 2025

(54) LOW PEAK-TO-AVERAGE POWER RATIO WAVEFORM GENERATION

(71) Applicant: QUALCOMM Incorporated, San Diego, CA (US)

(72) Inventors: Seyedkianoush Hosseini, San Diego, CA (US); Jing Jiang, San Diego, CA (US); Wei Yang, San Diego, CA (US); Gabi Sarkis, San Diego, CA (US); Peter Gaal, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 17/654,054

(22) Filed: Mar. 8, 2022

(65) Prior Publication Data

US 2023/0291630 A1 Sep. 14, 2023

(51) Int. Cl.
*H04L 27/26* (2006.01)
*H04W 16/14* (2009.01)
(Continued)

(52) U.S. Cl.
CPC ...... *H04L 27/2646* (2013.01); *H04L 27/2614* (2013.01); *H04W 16/14* (2013.01); *H04W 72/0453* (2013.01); *H04W 84/18* (2013.01)

(58) Field of Classification Search
CPC . H04W 84/18; H04W 16/14; H04W 72/0453; H04L 27/2646; H04L 27/2614
See application file for complete search history.

(56) References Cited

U.S. PATENT DOCUMENTS

| | | | | |
|---|---|---|---|---|
| 7,054,286 B2* | 5/2006 | Ertel | ............... | H04J 13/16 370/335 |
| 7,609,749 B1* | 10/2009 | Hall | ............... | H04J 13/12 370/320 |

(Continued)

FOREIGN PATENT DOCUMENTS

EP  3920458 A1  12/2021

OTHER PUBLICATIONS

International Search Report and Written Opinion—PCT/US2023/012952—ISA/EPO—May 23, 2023.

*Primary Examiner* — Raj Jain
(74) *Attorney, Agent, or Firm* — Paul M. McAdams; Procopio, Cory, Hargreaves & Savitch LLP

(57) ABSTRACT

Aspects presented herein provide a low PAPR waveform design based on resource spreading, pulse shaping, and/or dynamic MCS configuration, such that a transmitting wireless device may set IBO of its PA closer to the saturation point of the PA to enhance the PA efficiency. In one aspect, a first network node receives waveform information from a second network node, where the waveform information includes at least one of: one or more first parameters associated with a first waveform type or one or more second parameters associated with a second waveform type. The first network node processes data based on the one or more first parameters associated with the first waveform type or the one or more second parameters associated with the second waveform type. The first network node transmits a waveform based on the processed data, where the waveform is the first waveform type or the second waveform type.

38 Claims, 20 Drawing Sheets

(51) Int. Cl.
    *H04W 72/0453*    (2023.01)
    *H04W 84/18*      (2009.01)

(56) References Cited

U.S. PATENT DOCUMENTS

| | | | |
|---|---|---|---|
| 7,636,380 B2 * | 12/2009 | Yao | H04B 1/71632 |
| | | | 375/272 |
| 10,491,261 B1 * | 11/2019 | Al-Eidan | H04L 27/2003 |
| 10,880,145 B2 | 12/2020 | Shattil | |
| 2010/0054228 A1 * | 3/2010 | Michaels | H04W 72/12 |
| | | | 370/347 |
| 2011/0194587 A1 * | 8/2011 | Ram | H04B 7/18543 |
| | | | 375/E1.003 |
| 2018/0234996 A1 * | 8/2018 | Khoury | H04W 72/1263 |
| 2018/0324005 A1 | 11/2018 | Kim et al. | |
| 2020/0028611 A1 * | 1/2020 | Lee | H04J 99/00 |
| 2020/0221494 A1 | 7/2020 | Nakamura et al. | |
| 2020/0259693 A1 | 8/2020 | Baldemair et al. | |
| 2020/0374054 A1 | 11/2020 | Shattil | |
| 2021/0281455 A1 | 9/2021 | Lee et al. | |
| 2022/0286242 A1 * | 9/2022 | Khan | H04W 72/23 |
| 2023/0291630 A1 * | 9/2023 | Hosseini | H04W 72/0453 |

\* cited by examiner

1300

| MCS Index $I_{MCS}$ | Modulation Order $Q_m$ 1306 | Target code Rate R x 1024 | Spectral efficiency |
|---|---|---|---|
| 0 | $q$ | 60/$q$ | 0.0586 |
| 1 | $q$ | 80/$q$ | 0.0781 |
| 2 | $q$ | 100/$q$ | 0.0977 |
| 3 | $q$ | 128/$q$ | 0.1250 |
| 4 | $q$ | 156/$q$ | 0.1523 |
| 5 | $q$ | 198/$q$ | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | $q$ | reserved | |
| 29 | 2 | reserved | |
| 30 | 4 | reserved | |
| 31 | 6 | reserved | |

| MCS Index $I_{MCS}$ | Modulation Order $Q_m$ 1306 | Target code Rate R x 1024 | Spectral efficiency |
|---|---|---|---|
| 0 | $q$ | 60/$q$ | 0.0586 |
| 1 | $q$ | 80/$q$ | 0.0781 |
| 2 | $q$ | 100/$q$ | 0.0977 |
| 3 | $q$ | 128/$q$ | 0.1250 |
| 4 | $q$ | 156/$q$ | 0.1523 |
| 5 | $q$ | 198/$q$ | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | $q$ | reserved | |
| 29 | 2 | reserved | |
| 30 | 4 | reserved | |
| 31 | 6 | reserved | |

1402 markers at rows 5, 15, 23

| MCS Index $I_{MCS}$ | Modulation Order $Q_m$ | Target code Rate R x 1024 | Spectral efficiency | Spreading Factor |
|---|---|---|---|---|
| 0 | $q$ | 60/$q$ | 0.0586 | 1 |
| 1 | $q$ | 80/$q$ | 0.0781 | 1 |
| 2 | $q$ | 100/$q$ | 0.0977 | 1 |
| 3 | $q$ | 128/$q$ | 0.1250 | 1 |
| 4 | $q$ | 156/$q$ | 0.1523 | 1 |
| 5 | $q$ | 198/$q$ | 0.1934 | 2 |
| 6 | 2 | 120 | 0.2344 | 2 |
| 7 | 2 | 157 | 0.3066 | 2 |
| 8 | 2 | 193 | 0.3770 | 2 |
| 9 | 2 | 251 | 0.4902 | 2 |
| 10 | 2 | 308 | 0.6016 | 2 |
| 11 | 2 | 379 | 0.7402 | 2 |
| 12 | 2 | 449 | 0.8770 | 2 |
| 13 | 2 | 526 | 1.0273 | 3 |
| 14 | 2 | 602 | 1.1758 | 3 |
| 15 | 2 | 679 | 1.3262 | 3 |
| 16 | 4 | 378 | 1.4766 | 3 |
| 17 | 4 | 434 | 1.6953 | 3 |
| 18 | 4 | 490 | 1.9141 | 3 |
| 19 | 4 | 553 | 2.1602 | 3 |
| 20 | 4 | 616 | 2.4063 | 4 |
| 21 | 4 | 658 | 2.5703 | 4 |
| 22 | 4 | 699 | 2.7305 | 4 |
| 23 | 4 | 772 | 3.0156 | 4 |
| 24 | 6 | 567 | 3.3223 | 4 |
| 25 | 6 | 616 | 3.6094 | 4 |
| 26 | 6 | 666 | 3.9023 | 4 |
| 27 | 6 | 772 | 4.5234 | 4 |
| 28 | q | reserved | | |
| 29 | 2 | reserved | | |
| 30 | 4 | reserved | | |
| 31 | 6 | reserved | | |

FIG. 15

LOW PEAK-TO-AVERAGE POWER RATIO WAVEFORM GENERATION

TECHNICAL FIELD

The present disclosure relates generally to communication systems, and more particularly, to wireless communication involving peak-to-average power ratio (PAPR) reduction.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives waveform information from a second network node, where the waveform information includes at least one of: one or more first parameters associated with a first waveform type or one or more second parameters associated with a second waveform type. The apparatus processes data based on the one or more first parameters associated with the first waveform type or the one or more second parameters associated with the second waveform type. The apparatus transmits a waveform based on the processed data, where the waveform is the first waveform type or the second waveform type.

In another aspect of the disclosure, a method, a computer-readable medium, and an apparatus are provided. The apparatus transmits waveform information to at least one first network node, where the waveform information includes at least one of: one or more first parameters associated with a first waveform type or one or more second parameters associated with a second waveform type. The apparatus receives data from the at least one first network node, where the data is processed based on the one or more first parameters associated with the first waveform type or the one or more second parameters associated with the second waveform type.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 13 is a diagram illustrating an example modulation coding scheme (MCS) index table for physical uplink shared channel (PUSCH) with transform precoding and 64 quadrature amplitude modulation (64QAM) in accordance with various aspects of the present disclosure.

FIG. 14 is a diagram illustrating an example MCS index table in accordance with various aspects of the present disclosure.

FIG. 15 is a diagram illustrating an example MCS index table in accordance with various aspects of the present disclosure.

DETAILED DESCRIPTION

Figure 1:
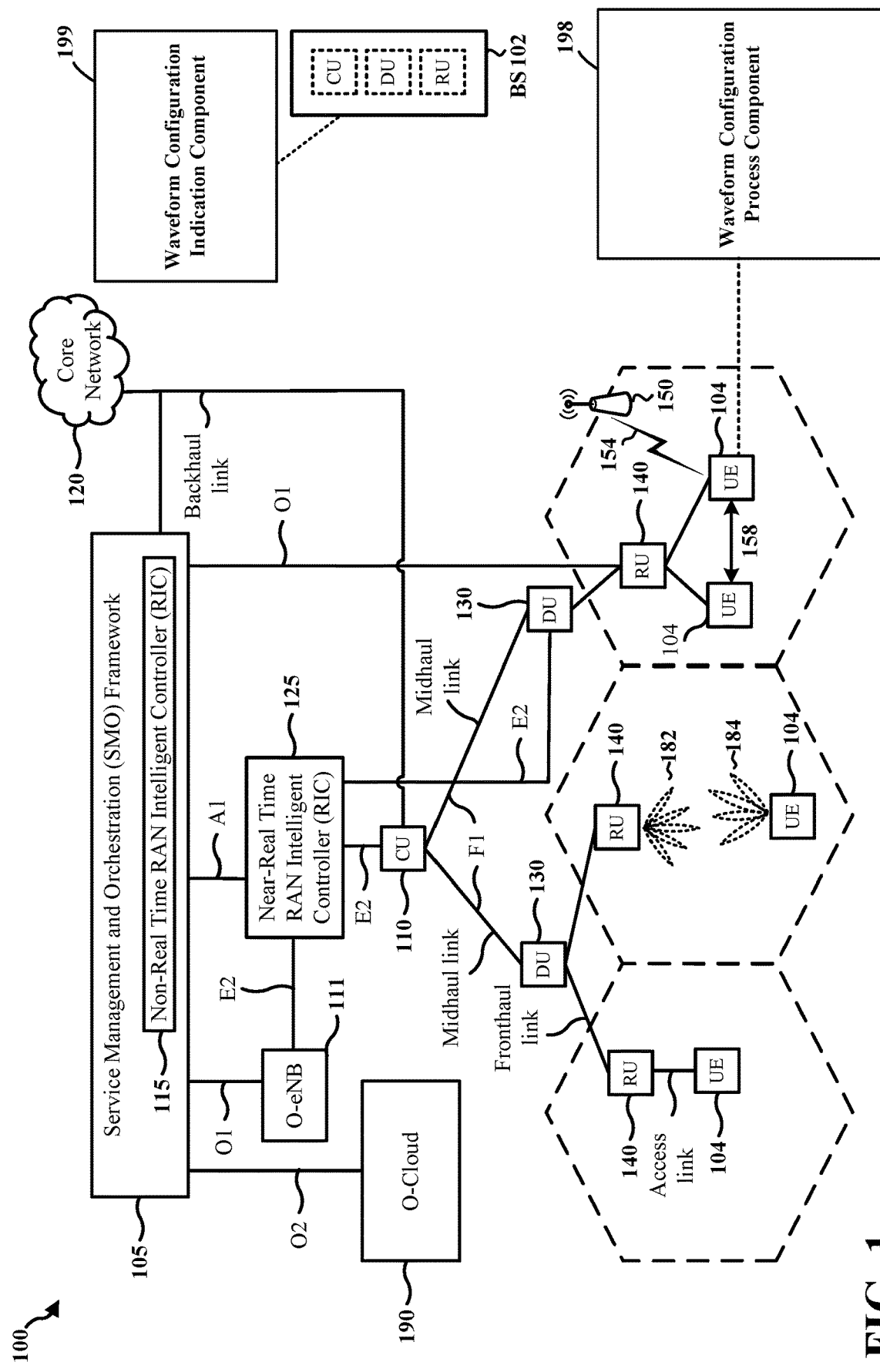
FIG. 1 is a diagram illustrating an example of a wireless communications system and an access network.

Aspects presented herein may improve communication performance and efficiency between wireless devices by enabling wireless devices to operate their power amplifiers (PAs) close to their saturation points. For example, aspects presented herein may provide a low peak-to-average power ratio (PAPR) waveform design based on resource spreading, pulse shaping, and dynamic modulation coding scheme (MCS) configuration, such that a transmitting wireless device may set the input backoff (IBO) of its PA closer to the saturation point of the PA to enhance the PA efficiency. Aspects presented herein may apply to discrete Fourier transform (DFT)-spread (DFT-s) waveform and/or orthogonal frequency division multiplexing (OFDM) waveforms, e.g., DFT-s may be a DFT precoded OFDM.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote unit (RU), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a first one or more components, a first processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) based on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (S Cell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a waveform configuration process component 198 configured to enable the UE 104 to apply one or more parameters associated with a waveform to a transmission to reduce PAPR of the transmission. In one configuration, the waveform configuration process component 198 may receive waveform information from a second network node, where the waveform information includes at least one of: one or more first parameters associated with a first waveform type or one or more second parameters associated with a second waveform type. In such configuration, the waveform configuration process component 198 may process data based on the one or more first parameters associated with the first waveform type or the one or more second parameters associated with the second waveform type. In such configuration, the waveform configuration process component 198 may transmit a waveform based on the processed data, where the waveform is the first waveform type or the second waveform type.

In certain aspects, the base station 102 may include a waveform configuration indication component 199 configured to enable the base station 102 to configure waveforms for multiple transmitters and to receive signals from the multiple transmitters that are at least partially overlap with each other. In one configuration, the waveform configuration indication component 199 may transmit waveform information to at least one first network node, where the waveform information includes at least one of: one or more first parameters associated with a first waveform type or one or more second parameters associated with a second waveform type. In such configuration, the waveform configuration indication component 199 may receive data from the at least one first network node, where the data is processed based on the one or more first parameters associated with the first waveform type or the one or more second parameters associated with the second waveform type.

Figure 2:
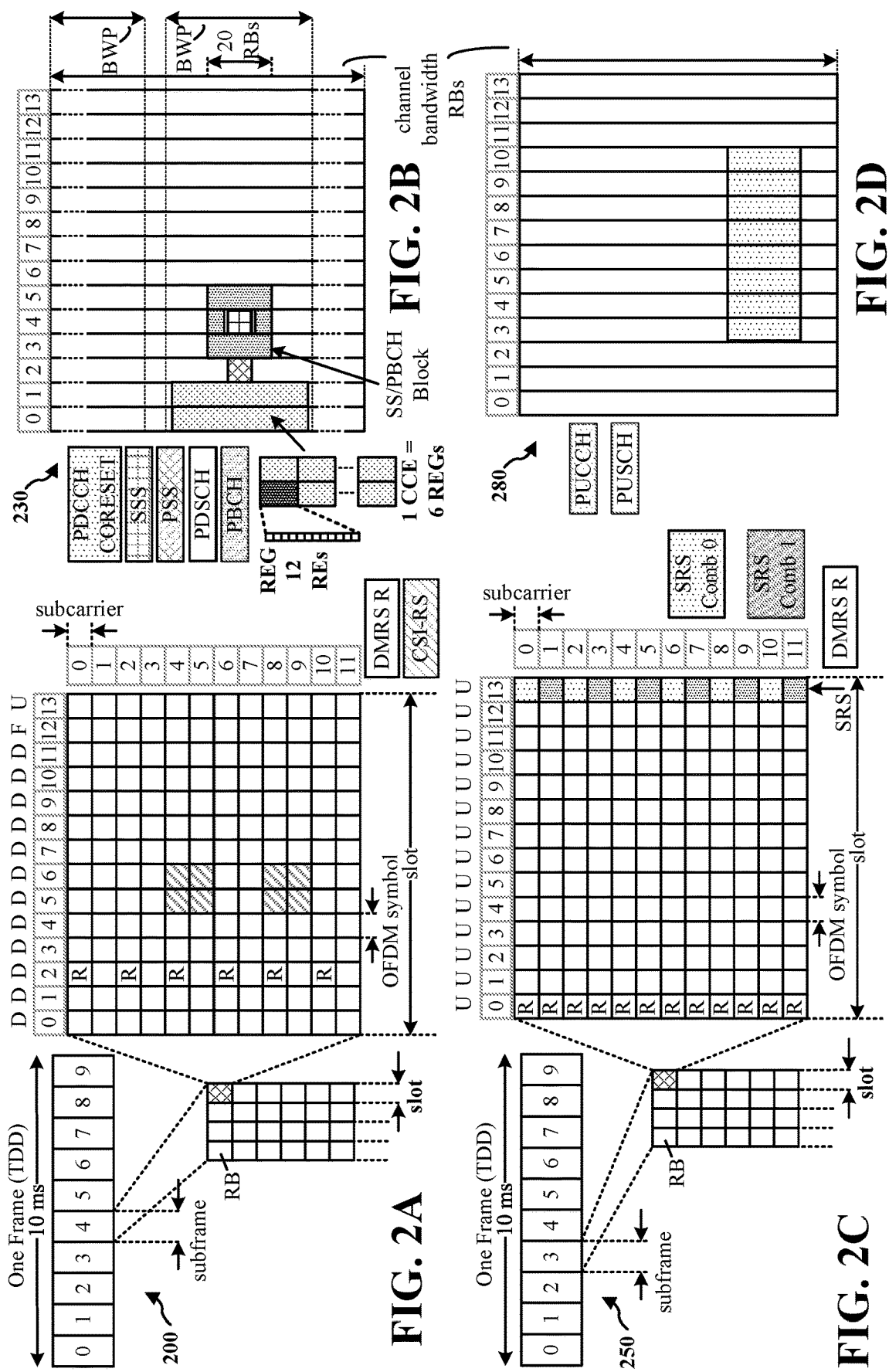
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols based on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations based on whether short or long PUCCHs are transmitted and/or the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
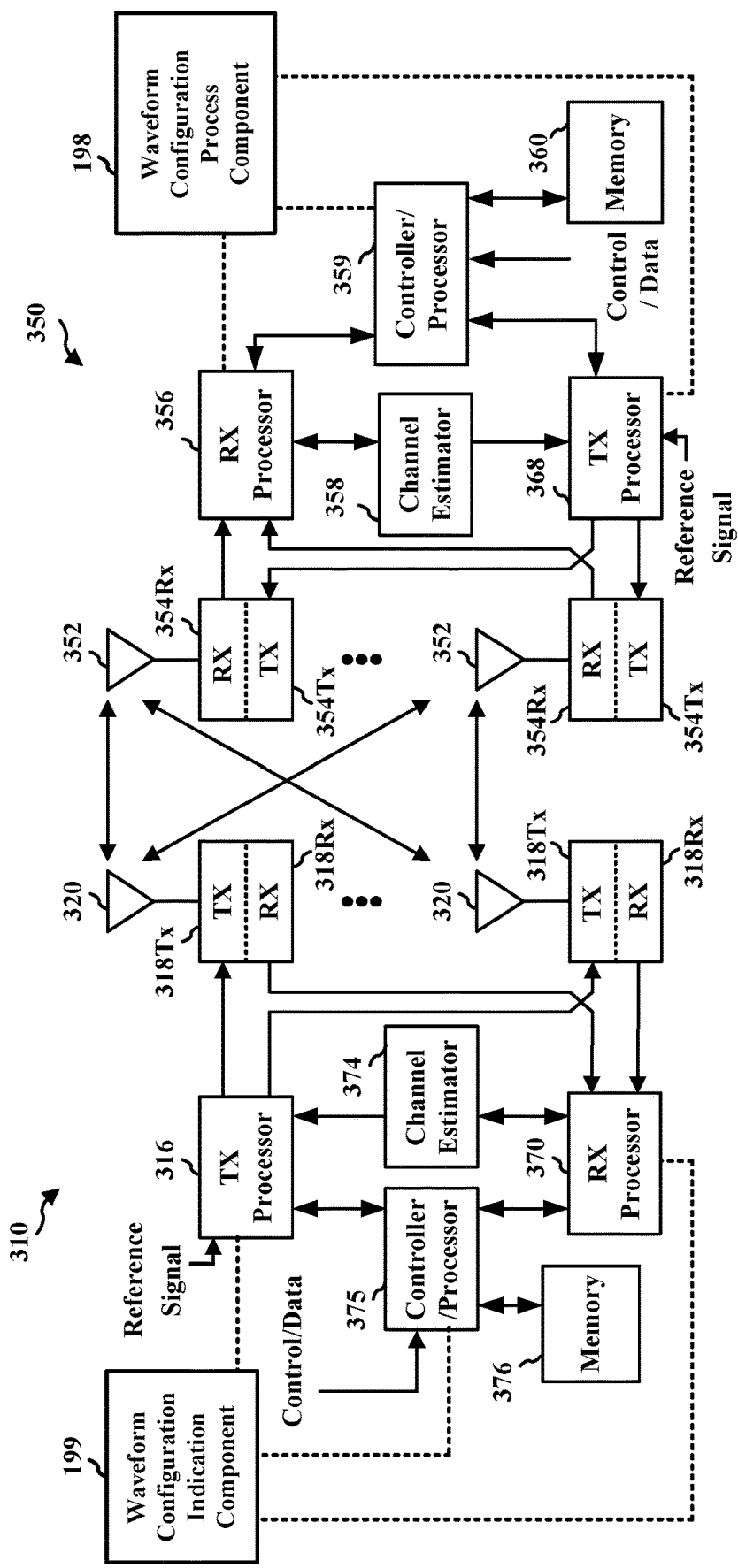
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the waveform configuration process component 198 of FIG. 1.

At least one of the TX processor 316, the RX processor 370, and the controller/processor 375 may be configured to perform aspects in connection with the waveform configuration indication component 199 of FIG. 1.

A power amplifier (PA) may refer to a device that is used for amplifying an input signal, such as by increasing or magnifying the magnitude (e.g., voltage, current, power, etc.) of the input signal. For example, a PA may take in a weak electrical signal or waveform, and then reproduce a similar but stronger waveform at an output by using extra power. The design and implementation of PAs in wireless communications may enable signals transmitted by a transmitting device (e.g., a base station, a UE, etc.) to be strong enough to reach a receiving device or a target. As a PA may consume addition power when amplifying an input signal, one goal in designing a PA with good efficiency (e.g., an ideal PA) is to provide a linear relationship between an input signal and an output signal, where power provided to amplifying the input signal is proportional to the output signal.

Figure 4:
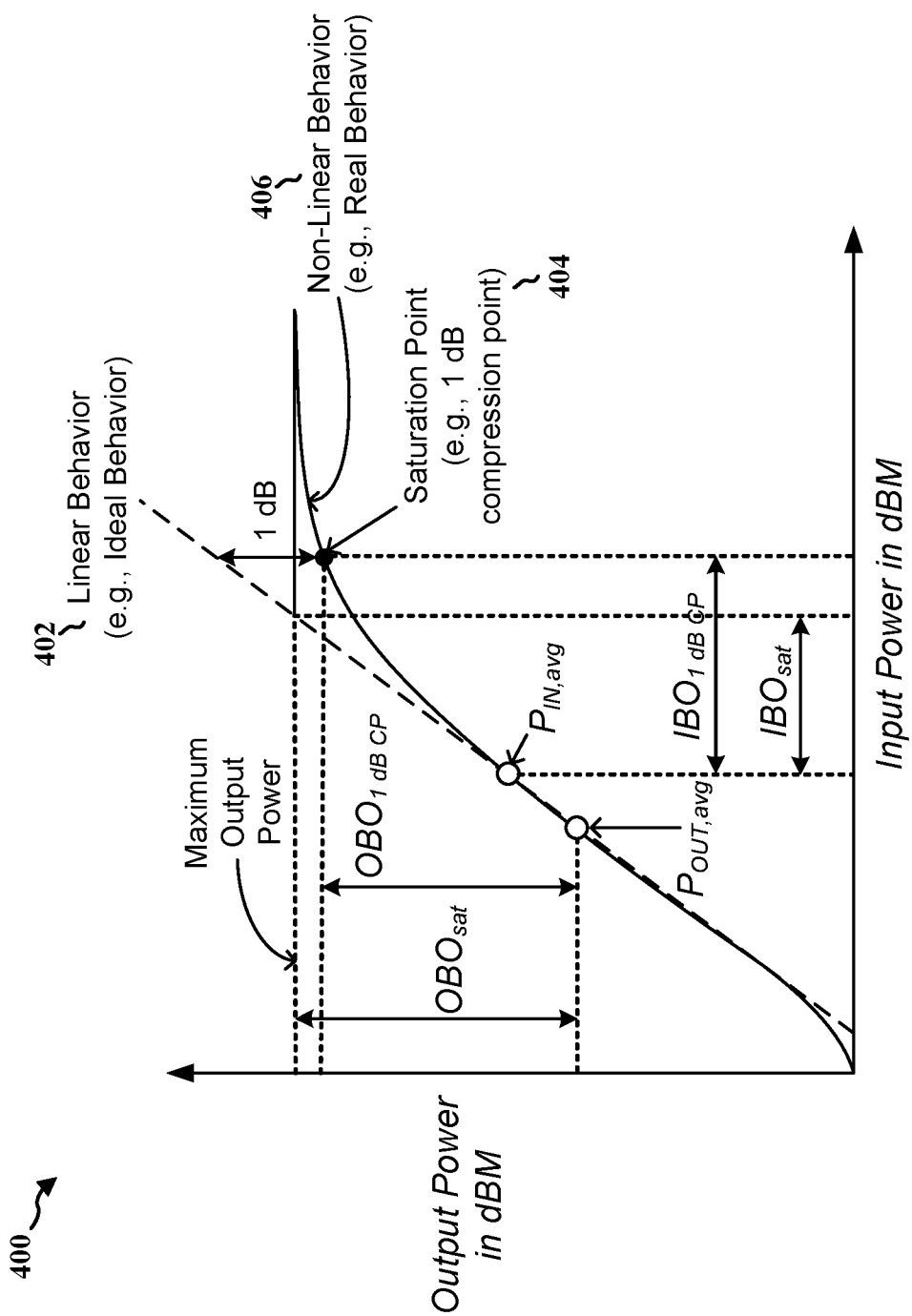
FIG. 4 is a diagram illustrating an example of relationship between an input signal and an output signal of a power amplifier in accordance with various aspects of the present disclosure.

FIG. 4 is a diagram 400 illustrating an example relationship between an input signal ($P_{in}$) and an output signal ($P_{out}$) for a PA in accordance with various aspects of the present disclosure. As shown 402, if a PA's amplification has a linear behavior, the output signal of the PA may be directly proportional to the input signal. For example, if 10 milliwatts (mW) of input signal power provides 15 mW of output signal power, then 20 mW of input signal power may provide 30 mW of output signal power, etc.

Figure 5:
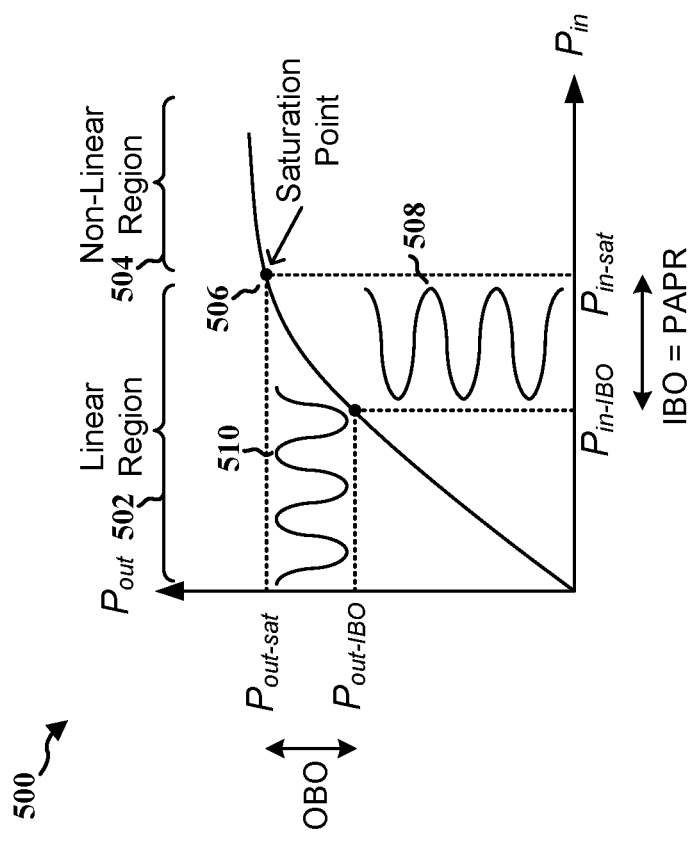
FIG. 5 is a diagram illustrating an example of operating a power amplifier at a mean input power in accordance with various aspects of the present disclosure.

However, most PAs may provide a linear behavior for a limited range of input signals (e.g., within the linear region 502 as shown by FIG. 5) and may have non-linear behavior outside the range of the input signals. As the output signal power of a PA may not increase indefinitely due to physical constrains, at certain points, such as at a saturation point shown at 404 (which may also be referred to as a one (1) dB compression point in some examples), an increase in the input signal power for the PA may not produce a discernible increase in the output signal power. Thus, the PA may start to follow a non-linear behavior as shown at 406, and the non-linear behavior may become particularly noticeable when the PA is operating at higher input signal powers (e.g., at the non-linear region 504 as shown by FIG. 5). For example, when the input power of a PA passes a saturation point, the PA may become saturated and the PA's output signal may no longer be proportional to the input signal, where a large increase in an input signal power beyond the saturation point may yield a relatively small increase in an output signal power from the saturation point. As a PA may consume a significant fraction of power in a communication device, operating the PA beyond the saturation point may waste additional power, and may be an inefficient use of the PA. In one example, the efficiency of a PA may be defined as $$\frac{P_T}{P_{DC}},$$

where PT denotes the average power of a transmitted signal and PDC denotes the direct current (DC)-input power supplied to the PA. In some examples, the non-linear behavior of the PA may also result in in-band and out-of-band distortion of the signal, and may degrade error vector magnitude (EVM) at a receiver when the input signal power and the output power are not proportional.

To avoid operating a PA beyond a saturation point (e.g., to avoid the drawbacks of the non-linearity at high input power), the PA may be configured to operate at a mean input power that is several dB lower than the saturation point, such that the input signal power may not exceed the saturation point. For example, a PA backoff (BO) may be applied to the PA, where the PA backoff may indicate the difference between the saturation point (or the 1 dB compression point) and the average signal power. In one example, the 1 dB compression point may be the point where the gain characteristics of a PA differs by 1 dB from the characteristics of a linear behavior (e.g., behavior of an ideal PA), such as shown at 402 of FIG. 4. Two types of backoff may be defined for a PA: an input backoff (IBO) and an output backoff (OBO). For the IBO, the average input power may be compared against the input power level that could cause saturation. For the OBO, the average output power may be compared against the output saturation power. In some examples, if a PA is configured to provide a unity gain, the IBO may equal to the OBO (e.g., IBO=OBO=BO) and may be given as the ratio of the maximum emitted power to the average power of the input signal.

FIG. 5 is a diagram 500 illustrating operating a PA at a mean input power (e.g., $P_{in-IBO}$) in accordance with various aspects of the present disclosure. For example, for an input signal waveform 508 with a high peak-to-average power ratio (PAPR), the waveform 508 may be transmitted in the linear region 502 of the PA by decreasing the average power of the input signal (e.g., $P_{in}$). This may be referred to as the IBO, which may result in a proportional OBO. PAPR may refer to a relation between the maximum power of a sample in a transmit symbol (e.g., an OFDM symbol) divided by the average power of that symbol. As such, the PAPR may denote a ratio of peak power to the average power of a signal, which may be expressed in the units of dB.

A PA may operate most efficiently when the PA is operating at the saturation point. However, due to non-zero PAPR of some waveforms, a power backoff may be specified for the PA to avoid running the PA into its nonlinear region (e.g., beyond the saturation point), which may cause EVM and emissions. As such, a PA may be configured to set the IBO closer or equal to the PAPR of the input signal. For example, if an input signal has a PAPR of X dB, then an IBO of X dB may be applied to the PA to avoid the non-linearity. This enables the input signal to be amplified within the linear region 502 when the waveform 508 of the input signal is at the peak. For example, if the waveform 508 has a PAPR of 10 dB, and the PA also has an IBO equals or close to 10 dB, the waveform 508 may be amplified within the linear region 502 without crossing the saturation point 506 (e.g., $P_{in-sat}$). This may prevent the output signal waveform 510 from experiencing distortion or clipping during an amplification, which may happen when the waveform 508 or part of the waveform 508 is amplified at the non-linear region 504.

Figure 6:
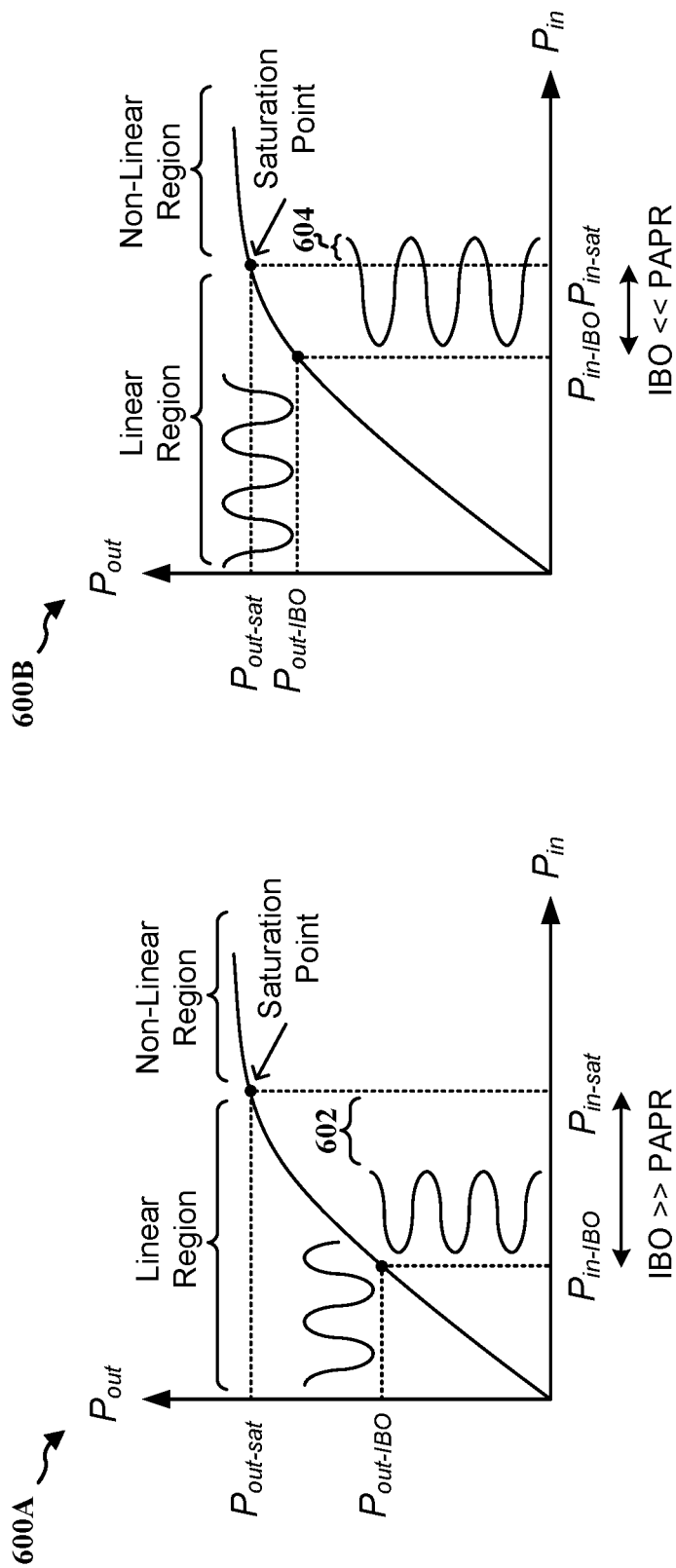
FIGS. 6A and 6B are diagrams illustrating examples of different input backoff setting in accordance with various aspects of the present disclosure

However, if a high IBO is applied to a PA but the input signal does not have a high PAPR (e.g., IBO>PAPR), such as shown by diagram 600A of FIG. 6A, it may be an inefficient use of the PA as it may reduce the maximum amplification of the PA. For example, a portion 602 of the linear region within the PA may be unused due to the high IBO, particularly the region close to the saturation points where a high input signal (e.g., near $P_{in-sat}$) may be amplified to nearly proportionate high output signal (e.g., near $P_{out-sat}$). This may limit the maximum performance of the PA and reduce a transmission range of a transmitting device. On the other hand, if the IBO applied to a PA is too low and the input signal has a PAPR that exceeds the IBO (e.g., PAPR>IBO), such as shown by diagram 600B of FIG. 6B, at least a portion (e.g., portion 604) of the input signal may be amplified at the non-linear region of the PA, which may cause the output signal to be distorted or clipped and the bit error rate (BER) performance of a transmitting device may be degraded.

While OFDM signals may have tolerance to inter-symbol interference and good spectral efficiency, due to large fluctuations in their signal envelopes, OFDM signals may suffer from significant PAPR that may grow rapidly with the size of the OFDM block. For example, for a network that employs larger OFDM blocks, the OFDM blocks may have higher PAPR. Due to the high PAPR, a PA designed for a communicating device capable of transmitting larger OFDM block(s) may be configured with a high IBO, which may result in an inefficient use of the PA when the communicating device is not transmitting signals with high PAPR, such as described in connection with FIG. 6A. Therefore, as an alternative or in addition to applying a high IBO to the PA, PAPR reduction techniques may be used to reduce the PAPR of an input signal, such that the IBO applied to a PA may be kept at a lower value to maintain the spectral and energy efficiency of the PA. In addition, by reducing the PAPR, a PA may amplify the signal at a higher input power (e.g., as close to the saturation point as possible and within the linear region) and produce a higher output signal.

As shown by FIG. 6A, to improve a PA's efficiency, the operating point of the PA may be configured to be as close as possible to its saturation point as the saturation point may be the point at which most of the supplied power is converted to the RF power. However, as shown by FIG. 6B, as the operating point of the PA is close to the saturation point, the signal may get clipped, which may occur when the amplitude of an input signal is larger than the saturation level of the PA. In some scenarios, clipping noise resulting from a signal being clipped may have a large spectrum, where clipping may make the signal more closely resemble a rectangular function in the time domain. Thus, in the frequency domain, the signal may appear as a sine cardinal (sinc) function. For purposes of the present disclosure, a sinc function may refer to an even function with a unity area. For example, a sinc pulse may pass through zero at all positive and negative integers (e.g., t=±1, ±2, . . . , etc.), but at time t=0, the sinc pulse may reach its maximum of one (1). Also, a sinc function may be symmetric with respect to the origin, such as shown at of FIG. 7. As a result, clipping may give rise to an undesirable spectrum mask for the signal due to additional in-band emission (IBE) (e.g., the ratio of a UE output power in a non-allocated resource block (RB) to the UE output power in an allocated RB) and adjacent channel leakage ratio (ACLR) (e.g., the ratio of the transmitted power on the assigned channel to the power received in the adjacent radio channel after a receive filter). As such, as shown by FIGS. 4, 5, 6A and 6B, designing waveforms with small/low PAPR and favorable spectral behavior may be an objective of many communication systems.

Aspects presented herein may improve communication performance and efficiency between wireless devices by enabling wireless devices to operate their PAs close to their saturation points. For example, aspects presented herein provide a low PAPR waveform design based on a dynamic resource spreading (e.g., spreading factor), pulse shaping, and/or MCS configuration, such that a transmitting wireless device may set the IBO of its PA closer to the saturation point of the PA to enhance the PA efficiency. Aspects presented herein may apply to discrete Fourier transform (DFT)-spread (DFT-s) waveforms and/or orthogonal frequency division multiplexing (OFDM) waveforms, e.g., DFT-s may be a DFT precoded OFDM.

In one aspect of the present disclosure, a PAPR of a signal may be reduced based on spreading and pulse shaping. Signal spreading, which may also be referred to as spectrum spreading, is a technique by which a signal generated with a particular bandwidth is deliberately spread in the frequency domain, resulting in a signal with a wider bandwidth. Pulse shaping is a process of changing the waveform of transmitted pulses, such that a signal to be transmitted may be shaped to better suited to its purpose or the communication channel, typically by limiting the effective bandwidth of the transmission. By filtering a transmitted pulses based on pulse shaping, the inter-symbol interference caused by the channel may be kept in control. As such, pulse shaping may be used for RF communication for making a signal to fit its frequency band.

Figure 7:
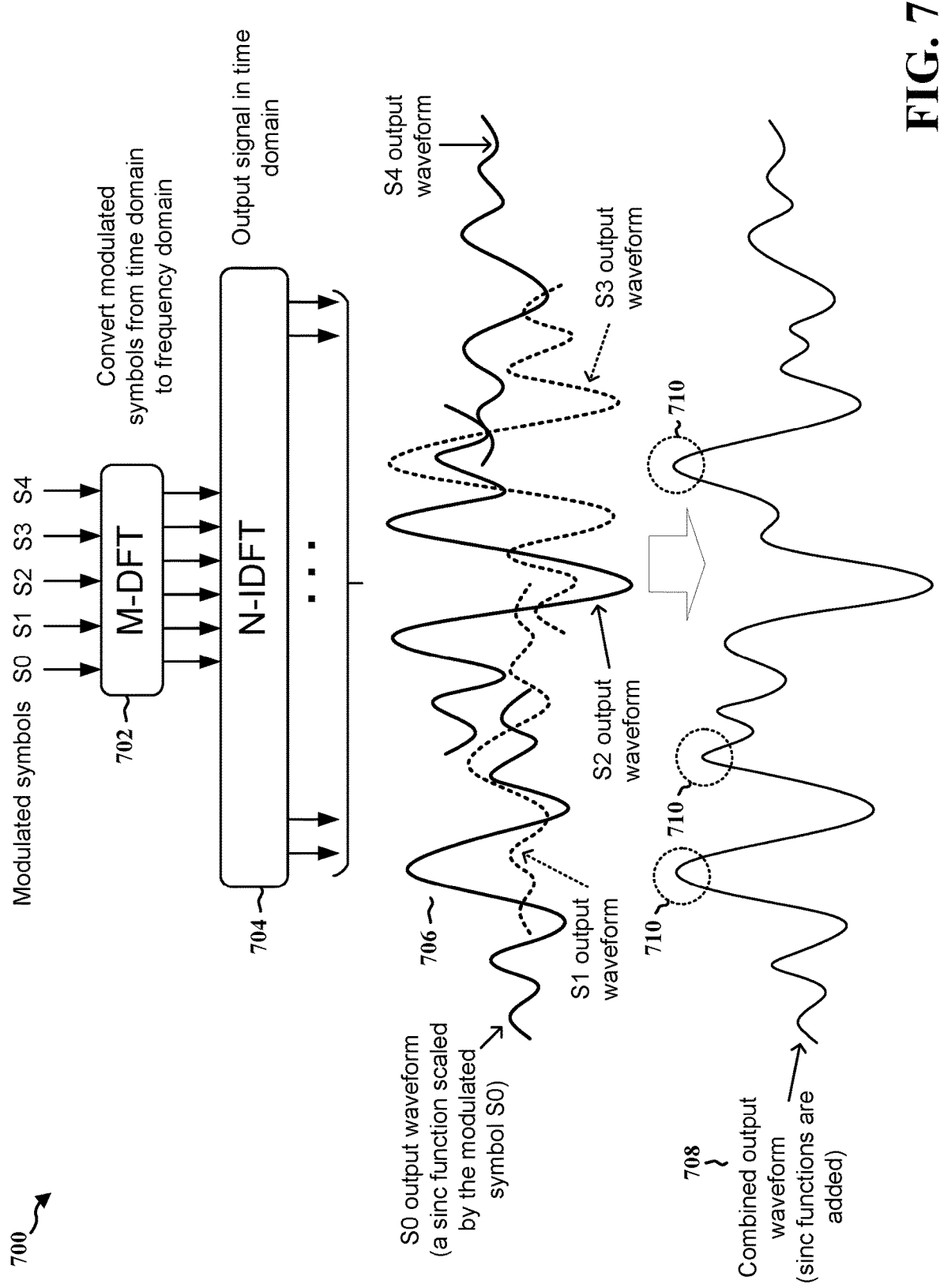
FIG. 7 is a diagram illustrating an example discrete Fourier transform (DFT)-orthogonal frequency division multiplexing (OFDM) (DFT-OFDM) in accordance with various aspects of the present disclosure.

FIG. 7 is a diagram 700 illustrating an example DFT-OFDM in accordance with various aspects of the present disclosure. As shown at 702, a group of M modulated symbols (e.g., $S_0, S_1, \ldots, S_M$) may form a block and may be used as an input to an M-point DFT. The M modulated symbols may be thought of as a representation of data in time domain, and the M-DFT output is in frequency domain. The modulated symbols may include data symbols, DMRS symbols, or a combination thereof. As shown at 704, the M-point DFT output is then passed as an input to an N-point IDFT, where N>M. The output signal is the final waveform in the time domain. As shown at 706, each of the sinc functions (e.g., S0, S1, S2, S3, S4 output waveforms) may be scaled by one of the modulated symbols $S_i$ (e.g., S0, S1, $S_M$). In some examples, these sinc functions may be added, sometimes constructively, which may degrade a PAPR of a transmission (e.g., increase the PAPR of the transmission). For example, as shown at 708, when the sinc functions are added together, the side lobe of a signal may increase the amplitude of a main peak (or a side lobe) of another signal, such as shown at 710. As described in connection with FIGS. 4, 5, 6A, and 6B, a transmitted waveform with larger amplitudes may result in a higher PAPR.

Figure 8:
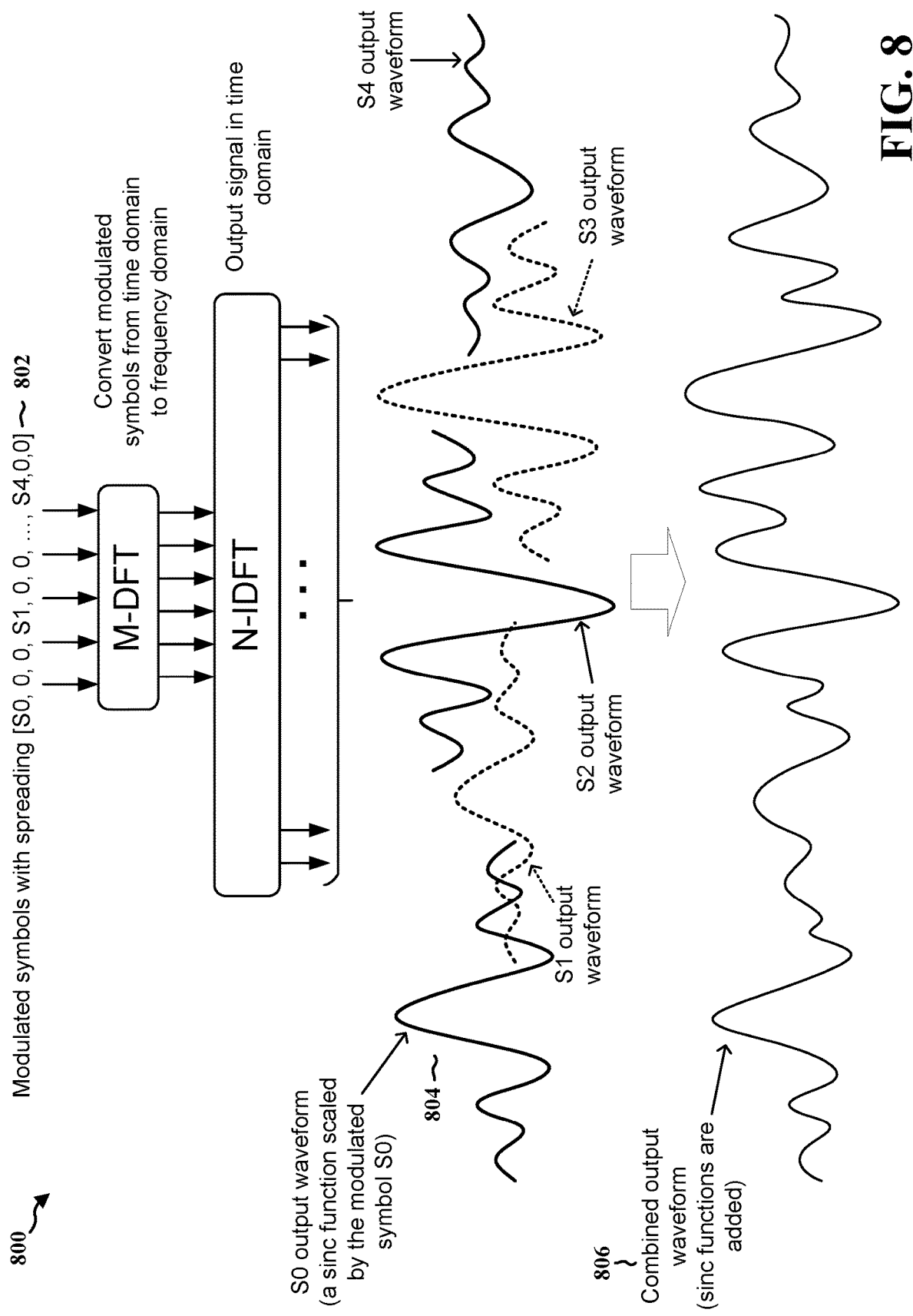
FIG. 8 is a diagram illustrating an example DFT OFDM with spreading (e.g., DFT-s-OFDM) in accordance with various aspects of the present disclosure.

FIG. 8 is a diagram 800 illustrating an example DFT-s-OFDM (e.g., DFT-OFDM with spreading) in accordance with various aspects of the present disclosure. As shown at 802, if the input symbols are spread, such as by inserting zero (0) bits between the symbols (e.g., $[S_0, 0,0, \ldots, S_1, 0,0, \ldots, S_4, 0,0, \ldots]$), as shown at 804, the sinc functions may be placed further apart. As each sinc function may be scaled by an input modulated symbol, if zeros are padded in-between the original input symbols, the associated sinc functions are scaled with zeros and do not show up. Hence, the distance between a sinc function scaled by $S_0$ and $S_1$, $S_1$ and $S_2$, etc., may increase. Hence, as shown at 806, the PAPR of the transmitted signal may be reduced as the tail of each sinc functions decays more before reaching the significant lobes of the next sinc function. In some examples, if in addition to spreading (e.g., via adding zeros in-between the modulated symbols in the time-domain), amplitude/pulse shaping is also employed, the summation of the sinc functions may be better controlled and the PAPR may be further reduced.

Figures 9A, 9B:
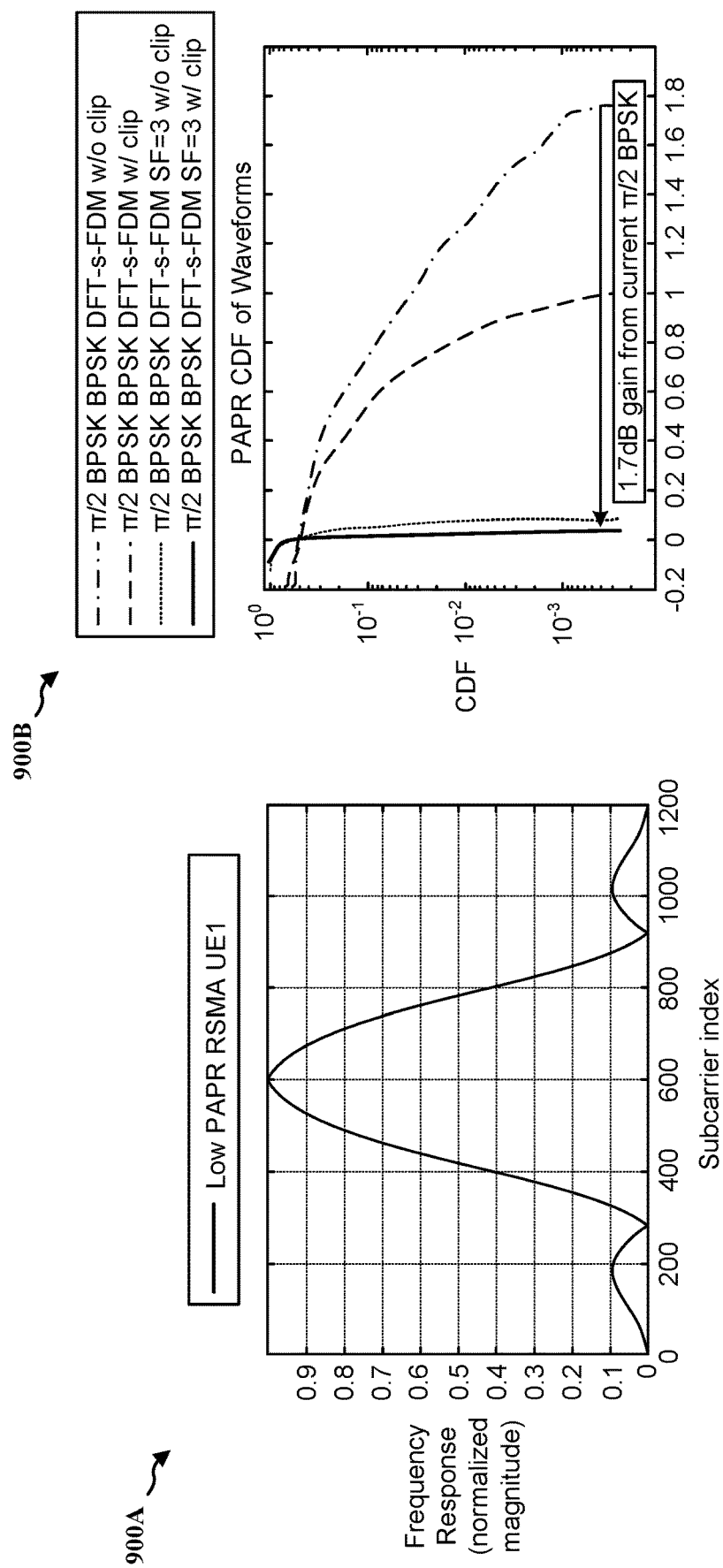
FIGS. 9A and 9B are diagrams illustrating an example of a spread signal based on π/2-bpsk modulation and its peak-to-average power ratio (PAPR) evaluation in accordance with various aspects of the present disclosure.

FIGS. 9A and 9B are diagrams 900A and 900B illustrating an example of a spread signal based on π/2-bpsk modulation and its PAPR evaluation in accordance with various aspects of the present disclosure. As described in connection with FIG. 8, input symbols $[x_0, x_1, \ldots, x_n]$ may first be spread (by a spreading factor (SF) of three (3) as an example) as $X=[x_0, 0,0, x_1, 0,0, \ldots, x_n, 0,0]$. This vector is then passed to a time-domain filter which may repeat each modulated symbol uniformly or non-uniformly. For example, if each modulated symbol is repeated uniformly, X may be convolved with a 3-tap filter whose taps are identical (e.g., [1, 1, 1]). On the other hand, if each modulated symbol is repeated non-uniformly, X may be convolved with a 3-tap filter including taps that are not identical. For example, a 3-tap filter including taps corresponding to [−0.248, 0.5, −0.248] is used for simulations shown by the diagrams 900 and 900B. For purposes of the present disclosure, a tap may refer to a coefficient value and the impulse response of a filter may refer to the filter's coefficients. For example, under digital signal processing (DSP), a tap may be used for defining impulse response of systems, such as for a finite impulse response (FIR) filter.

Then, if pulse shaping is also employed, the output of the time domain filter above (e.g., the spread signal in time domain) may further be convolved with a pulse shaping filter (e.g., a 3-tap pulse shaping filter with taps corresponding to [1, −0.24, 1]), which may further shape the time-domain signal to reduce PAPR. In some example, this pulse shaping filter may also be referred to as a frequency-domain spectrum shaping filter (FDSS), and the taps of the FDSS may not decreasing on the two sides of the center tap, e.g., [1, −0.24, 1], [1.3, −0.2, 1.3], or [X, Y, X], etc. Note that the filtering (either the time domain filter added after spreading or the pulse shaping filter added for further pulse shaping) may be implemented in either the time domain or the frequency domain.

In another example, instead of using two separate filters for spreading and pulse shaping (e.g., first filter (f1) and second filter (f2)), a single filter with taps given by f1*f2 in the time domain may be used. For example, if f1=[−0.248, 0.5, −0.248] and f2=[1, −0.24, 1] as used in the example above, a compound 5-tap filter may be derived by convolving f1 and f2 in the time domain to obtain taps with the value of [−0.2334, 0.5267, −0.5798, 0.5267, −0.2334]. This convolving mechanism may be implemented in the time domain or the frequency domain to reduce the number of filter used at a communication device.

As shown by the diagram 900A of FIG. 9A, an input signal with 400 subcarriers (SCs) that goes through signal spreading with SF of three (3) and pulse shaping may result in an output signal with 1200 SCs and a high peak with two low side lobes. As shown by the diagram 900B of FIG. 9B, by applying the spreading to the input signal that is modulated based on π/2-bpsk, there may be a 1.7 dB gain in PAPR compared to the input signal without spreading.

As discussed in connection with FIGS. 8, 9A, and 9B, signal spreading and pulse shaping (either in time domain (TD) or frequency domain (FD)) may expand the spectrum of the signal, which may also be referred to as bandwidth (BW) expansion. For example, the spectrum of the signal may be multiplied based on the spreading factor configured. Thus, for DFT-s-OFDM, the BW expansion may be seen as follows: without spreading, the input signal is mapped to an M-point DFT; hence, the output of the DFT block which is in frequency domain is of length M (e.g., M subcarriers are occupied). On the other hand, if the input is spread by a factor of K, a K*M-point DFT may be specified, which means that the waveform is occupying K times more subcarriers compared to the first scenario. While applying spreading to an input signal may increase the bandwidth of the signal, in another aspect of the present disclosure, the expanded bandwidth may be utilized or exploited by multiple UEs to converse resource use.

Figure 10:
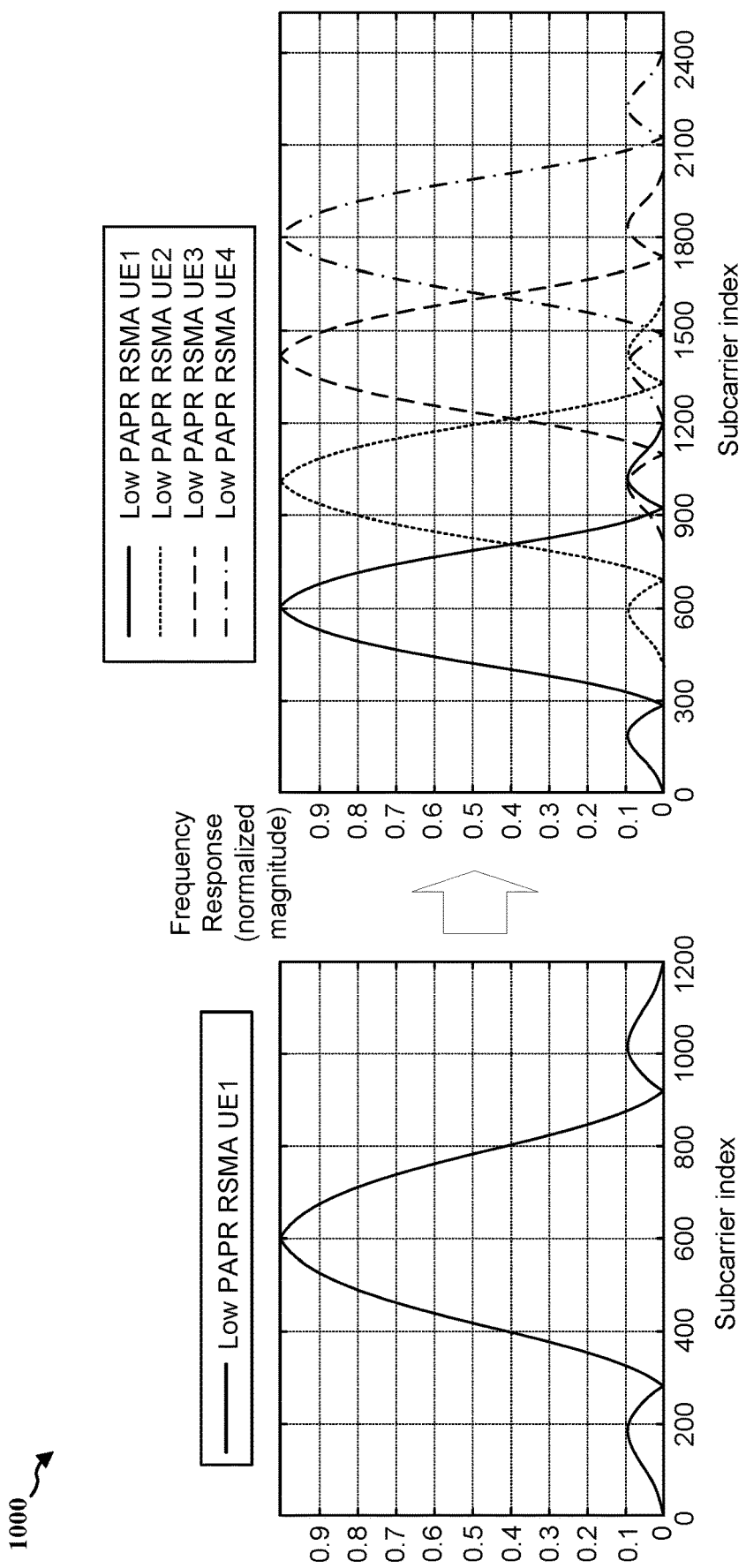
FIG. 10 is a diagram illustrating an example of resource spread multiple access (RSMA) with low PAPR waveform and partial overlapping in accordance with various aspects of the present disclosure.

FIG. 10 is a diagram 1000 illustrating an example of resource spread multiple access (RSMA) with low PAPR waveform and partial overlapping in accordance with various aspects of the present disclosure. As described in connection with FIG. 9A, when 400 SCs (or tones) are used for mapping the modulated symbols and an SF of three (3) is applied to the modulated symbols, the spectrum of the signal may span over 1200 SCs (or tones). However, the additional 800 SCs (or tones) may also be used by other UEs for transmission to/from other UEs, and thus not be wasted.

For example, as shown by the diagram 1000, if four transmitters or transmitting devices (e.g., UEs, sidelink devices) are applying the same spreading factor (e.g., SF=3) (and pulse shaping) to their input signals, each of the four transmitters may use 1200 SCs. A receiver (e.g., a base station, component(s) of the base station, or a receiving sidelink device) may then receive three copies of each modulated symbol sent from each individual transmitter, and the receiver may combine them to obtain a better estimate. In other words, based on resource spreading, multiple transmitters may transmit or receive signals that are at least partially overlap with each other. For example, 2400 SCs may be used by four transmitters (e.g., 600 SCs per transmitter on average) instead of 4800 SCs (e.g., if there is no overlap). Thus, applying spreading to a communication may not necessarily increase the overall bandwidth of the communication significantly if multiple transmitters can be configured or coordinated to apply the same spreading factor for their communications.

As discussed in connection with FIG. 10, spreading the signal may enable non-orthogonal multiple access (NOMA) across multiple different transmitters (e.g., UEs, sidelink devices) where transmitters may be multiplexed in the frequency domain over a portion of the available BW (e.g., 2400 SCs). Without applying spreading, transmitters may not be able to transmit/receive signals that are at least partially overlapping with each other based on NOMA. In some examples, for channel estimation, DMRS symbols may be spread and filtered in the same way as the data symbols (e.g., with the same spreading factor and the same filters). Hence, DMRS may also be repeated across a multiple of K more subcarriers, where K is the spreading factor.

Figure 11A:
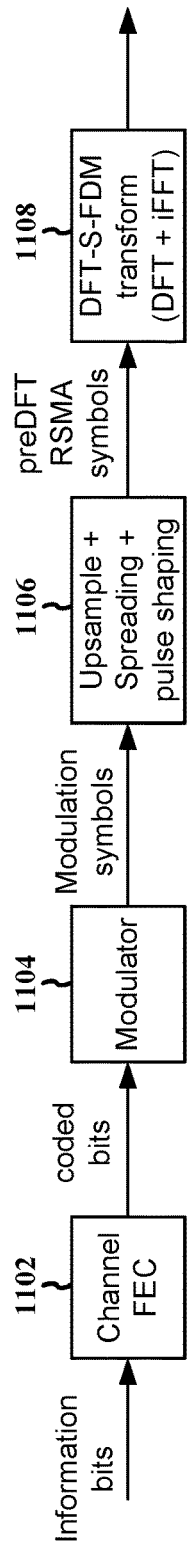
FIG. 11A is a diagram illustrating an example of generating transmission (Tx) signal based on spreading and pulse shaping in time domain in accordance with various aspects of the present disclosure.

FIG. 11A is a diagram 1100A illustrating an example of generating transmission (Tx) signal based on spreading and pulse shaping in time domain in accordance with various aspects of the present disclosure. At 1102, information bits that are to be transmitted by a transmitter (e.g., a UE, a sidelink device, a base station, a component of the base station, etc.) may pass through a channel forward error correction (FEC) encoder to convert the information bits to encoded bits. FEC is a technique that may be used to control error in the data transmission over noisy transmission channels. One concept may be to encode the signal in a redundant way by using error correcting code (ECC) in the transmitter, which enables a receiver to detect a limited number of error bits in the transmitted signal and to correct these errors without specifying the transmitter to re-transmit the signal.

At 1104, the encoded bits may pass through a modulator, where the encoded bits are converted to modulate symbols. Then, at 1106, the modulated symbols may go through one or more filters for applying upsampling, spreading, and/or pulse shaping. Upsampling may be specified for transmission because the signal's frequency representation is to be narrow and confined to frequencies around the carrier frequency. By upsampling the signal, the frequency response of the signal to be transmitted may be compressed and becomes band limited to a significantly smaller range of frequencies, which may be specified for the transmission. Upsampling may include a process of inserting zero-valued samples between original samples to increase the sampling rate. In another example, as described in connection with FIG. 8, the modulated symbols (e.g., S0, S1, S2, etc.) may pass through a time domain filter after applying spreading (e.g., padding zeros in between the modulated symbols), and/or the modulated symbols may pass through a pulse shaping filter for pulse shaping. In another example, as described in connection with FIG. 8, a combined filter may be used instead of using separate filters. Based on the upsampling, spreading, and/or pulse shaping, the modulated symbols are converted to pre-DFT RSMA symbols.

At 1108, the pre-DFT RSMA symbols may go through discrete Fourier transform (DFT) and inverse fast Fourier transform (iFFT) to produce an output signal (e.g., a DFT-s-OFDM) that is to be transmitted by the transmitter at the front end (e.g., at one or more antennas).

Figure 11B:
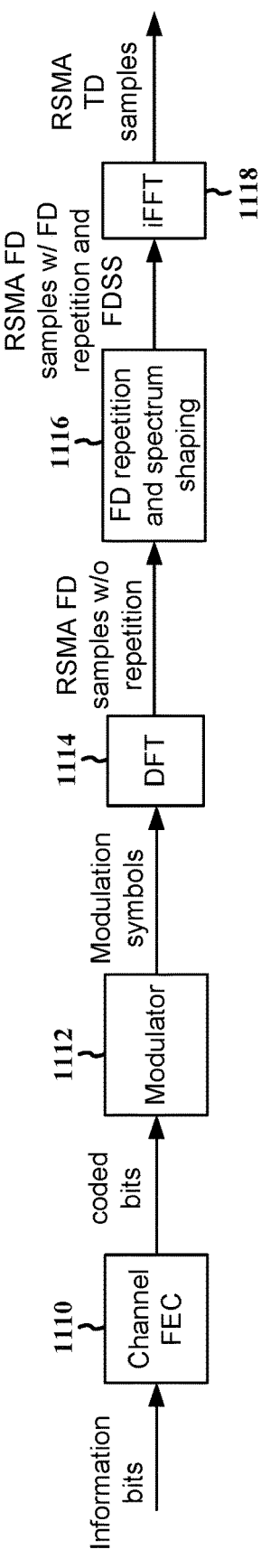
FIG. 11B is a diagram illustrating an example of generating Tx signal based on spreading and pulse shaping in frequency domain in accordance with various aspects of the present disclosure.

FIG. 11B is a diagram 1100B illustrating an example of generating Tx signal based on spreading and pulse shaping in frequency domain in accordance with various aspects of the present disclosure. At 1110, information bits that are to be transmitted by a transmitter (e.g., a UE, a sidelink device, a base station, a component of the base station, etc.) may pass through a channel FEC encoder to convert the information bits to encoded bits. At 1112, the encoded bits may pass through a modulator, where the encoded bits are converted to modulate symbols. Then, at 1114, the modulated symbols may go through a DFT precoder, where the modulated symbols (e.g., discrete time signals) are converted to RSMA frequency domain samples without repetitions.

At 1116, the RSMA frequency domain samples may go through one or more filters for applying frequency domain repetition and/or spectrum shaping, which are steps similar to the spreading and the pulse shaping in time domain. For example, the filters described in connection with FIG. 11A at 1106 may be applied to a signal in the time domain, whereas at 1116 of FIG. 11B, a transmitter may first convert a signal as well as filters to the frequency domain, and then filter the signal in the frequency domain. In some examples, the resource spreading and/or the pulse shaping mechanism described herein may also applied to OFDM waveforms. For example, after modulating the coded bits at 1112, the modulated bits may be sent to the one or more filters at 1116 without going through DFT. In other words, for OFDM waveforms, step described in connection with 1114 may be skipped. Based on the frequency domain repetition and/or the spectrum shaping, the RSMA frequency domain samples are converted to RSMA frequency domain samples with FD frequency domain repetition and FDSS.

At 1118, the RSMA frequency domain samples with FD frequency domain repetition and FDSS may go through an iFFT to produce an output signal (e.g., RSMA time domain samples) that is to be transmitted by the transmitter at the front end (e.g., at one or more antennas).

Figure 12:
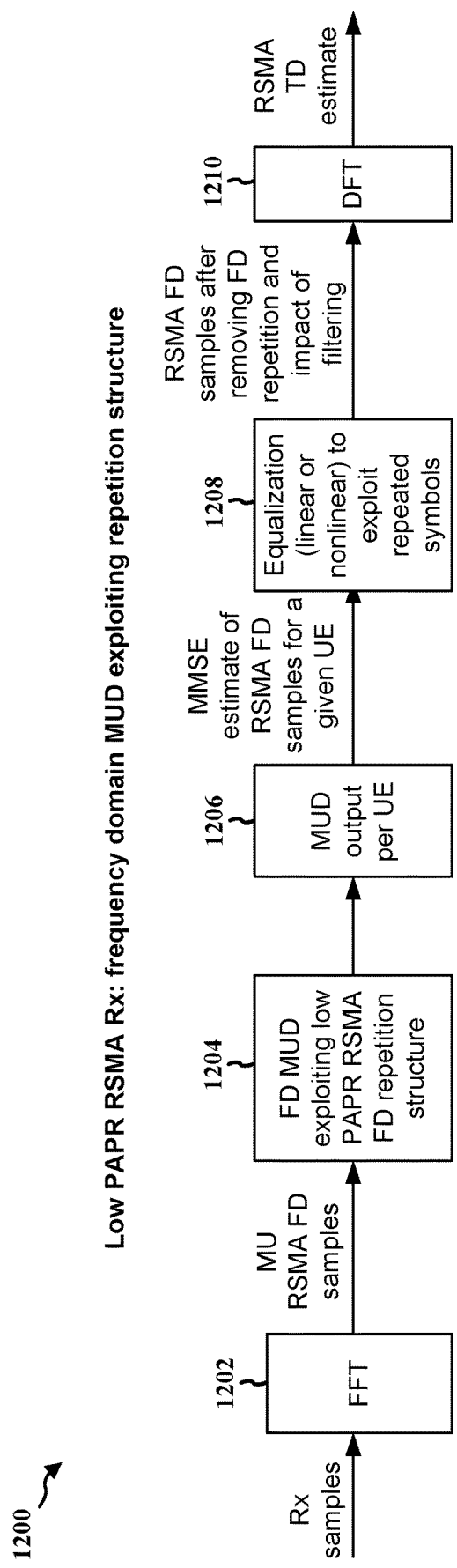
FIG. 12 is a diagram illustrating an example receiver structure for receiving signals from multiple transmitters with the same spreading factor in frequency domain in accordance with various aspects of the present disclosure.

FIG. 12 is a diagram 1200 illustrating an example receiver structure for receiving signals from multiple transmitters with the same spreading factor in frequency domain in accordance with various aspects of the present disclosure. In one example, as discussed in connection with FIG. 10, at the receiver (Rx) side (e.g., a base station or component(s) of the base station), joint multi-user detection (MUD) across multiple UEs in the frequency domain may be applied by the receiver. For example, the receiver may utilize or exploit the repetition structure of the signals received from multiple UEs to perform the MUD, where the receiver having the knowledge or able to determine that each symbol is repeated multiple times may combine the repeated symbols to obtain a better estimate.

For example, as shown by the diagram 1200, at 1202, the receiver may first map Rx samples received from multiple UEs (e.g., Rx samples with spreading and/or pulse shaping) to frequency domain based on an FFT operation. At 1204, the receiver may perform frequency domain multi-user detection (FD MUD) by exploiting the fact that the bandwidth of each user is expanded by K times (e.g., K being the spreading factor). Based on the FD MUD operation, the receiver may determine the received signal (e.g., MUD output) for each UE, such as shown at 1206. At 1208, the received signal for each UE is then passed to an equalizer or an equalization block (linear or nonlinear), where the receiver may leverage the fact that each symbol is repeated K times and is filtered to remove the filtering applied to the received signal (e.g., the spreading and/or the pulse shaping).

At 1210, after removing the impact of filtering (e.g., spreading and/or shaping) from the received signal of each UE, the transmitter may apply DFT to the output signal to obtain the time-domain symbols (which are the modulated symbols if DFT-s-OFDM waveform is used). Note that the example block chain described in connection with FIGS. 11A, 11B, and 12 are merely an example for illustrative purposes, different operations may be performed in either the frequency domain (as shown by the diagram 1200) or in the time domain equivalently.

As illustrated by FIGS. 11A, 11B, and 12, a spreading based multi-access scheme receiver (e.g., a base station or a component of the base station) may employ MUD by exploiting the correlation structure of the spreading sequence. As signal spreading (or the SF) may effectively create multiple copies of an original frequency domain RSMA signal, the multiple copies of the signal may be viewed/perceived by the receiver as received from different Rx antennas. In some scenarios, when multiple UEs are overlaid, MUD operation may have a multi-input multi-output (MIMO) detection problem. In such scenarios, a standard MIMO minimum mean square error (MMSE) receiver or any other MIMO receiver scheme may be used to resolve the problem.

In another aspect of the present disclosure, to keep the spectral efficiency of a transmission while applying spreading and/or pulse shaping to the transmission, a transmitter may be configured to apply different modulation coding scheme (MCS) values based on an MCS table with flexible switching point across different MCS values.

FIG. 13 is a diagram 1300 illustrating an example MCS index table for physical uplink shared channel (PUSCH) with transform precoding and 64 quadrature amplitude modulation (64QAM) in accordance with various aspects of the present disclosure. In some network implementations, repetition of modulated symbols, which may be considered as equivalent to bandwidth expansion, may be configured for a transmitter or transmitting device (e.g., a UE, a sidelink device, a base station, a component of a base station, etc.) in order to gain a lower coding rate. For example, when the MCS index table shown by the diagram 1300 is used in association with DFT-S waveforms, it may provide very low spectral efficiency values (e.g., with at least four times (4x) repetition beyond the lowest coding rate). The coding rate (or "code rate") may refer to the ratio between information bits and total transmitted bits (e.g., information bits plus redundant bits), where redundant bits may be added by the physical layer for FEC. As such, the coding rate may also represent the ratio between the number of information bits at the top of a physical layer and the number of bits which are mapped to the channel at the bottom of the physical layer. A low coding rate may correspond to an increased redundancy, whereas a high coding rate may correspond to a decreased redundancy.

For example, as shown at 1302, for an MCS index ($I_{MCS}$) equal to zero ($I_{MCS}=0$) with $\pi/2$-bpsk (i.e., modulation order Qm=q=1), the coding rate is 60/1024=0.0586, which may be lower than a smallest base code rate. A base code rate may refer to a minimum code rate that can be achieved by a transmitter without applying repetition. As such, if the base code rate is 0.2, for a transmission (e.g., a PUSCH transmission) with this MCS setting, the coded bits may be specified to repeat four times (e.g., $0.2/0.0586 \approx 4$) for the transmission (e.g., the transmitted PUSCH). In some examples, the value of q in this MCS table may be set by a higher layer signaling.

In one aspect of the present disclosure, instead of applying repetition to the coded bits or the modulated symbols to gain a lower coding rate, a transmitter may keep spectral efficiency the same while perform spreading in a controlled manner to further improve the PAPR. For example, a transmitter may be configured to maintain a spectral efficiency of X (e.g., keep X unchanged) for a transmission with M subcarriers. Thus, without spreading, the transmission may specify M subcarriers and the coding rate may be set to keep spectral efficiency=X over these M subcarriers. However, if spreading with a spreading factor of K is applied to the transmission, such as described in connection with FIG. 8, there may be K–1 additional copies of each modulated symbol and the bandwidth is expanded by the factor of K (e.g., if spreading factor of three is applied to a set of modulated symbols, there may be two additional copies of modulated symbols and the bandwidth may be expanded by three times). Hence, to maintain the same spectral efficiency as without the spreading, the transmitter may be specified to increase the coding rate. For example, if 400 resource elements (REs) are transmitted based on QPSK, 800 bits may be transmitted over these 400 REs. On the other hand, if these 400 REs are repeated three times (e.g., applying a spreading factor of three), there may be 1200 REs instead. As such, to maintain the same spectral efficiency (e.g., the number of information bits over total bits transferred or resources used) for transmission with repetitions, a higher coding rate may be used. In other words, the coding rate may increase when repetition (e.g., spreading factor) is applied in order to maintain the same or similar spectral efficiency.

In one aspect, a transmitter may be provided with at least one flexible switching point across different MCS values on an MCS table. For purposes of the present disclosure, the term switching point (or switch point) may refer to a borderline between using two different modulation orders in an MCS table. For example, referring back to FIG. 13, the dashed line at 1304 may indicate a switch point between modulation order of two (2) and modulation order of (4).

For example, since $$\frac{\pi}{2} - BPSK$$

may nave about 2-3 dB PAPR gain over QPSK, the switch point between $$\frac{\pi}{2} - BPSK$$

and QPSK may be configured to be more flexible, such as capable of being changed or modified dynamically. In one example, one or more switching points may be indicated to the transmitter (e.g., a UE), where the indication may be dynamic or semi-static. As such, the transmitter may receive a dynamic indication or a semi-static configuration from a receiver (e.g., a base station or a component of the base station) on the setting of the parameter q.

For example, referring back to FIG. 13, a UE may be configured with multiple switching points between different modulation orders. Then, as shown at 1306, a base station may configure the UE with different values modulation order q for different MCS index, and the UE may apply the switching points based on the values of q. For example, the q value of MCS index 0, 1, 2 may be equal to one (1), whereas the q value of MCS index 3 may be equal to three (2). As such, a switching point may lie between MCS index 2 and 3. This mechanism may also be applied to set the modulation order of all other entries too.

In another example, as shown by the diagram 1400 of FIG. 14, a transmitter (e.g., a UE) may be configured with different MCS tables, where each MCS table may have different switching points 1402 across different modulation orders. The UE may receive an indication from the base station regarding when to apply one of these MCS tables.

In some examples, the indication from the base station may also indicate the modulation order and/or the spreading factor. Such an indication may be configured to be implicit (e.g., the spreading is derived from the modulation order based on higher layer signaling or hard-coded based on a specification or a predefined rule) or explicit (e.g., each indication may be signaled separately).

In one example, the indication of the modulation order and/or the spreading factor may be waveform dependent. For example, the indication of the modulation order and/or the spreading factor may be different across OFDM and DFT-s-OFDM or another waveform types. In another example, the indication of the modulation order and/or the spreading factor may be tied to the filter coefficients as well. For example, a UE may be configured with different time domain/frequency domain spreading or shaping filter(s), and the UE may choose a filter based on the modulation order and/or the spreading factor. Similarly, the filter coefficients may be signaled to the UE (e.g., by a base station) or be hard-coded based on a specification or a predefined rule.

In another example, the indication of the modulation order and/or the spreading factor from a receiver (e.g., a base station or a component of the base station) may be based on the reporting from a transmitter (e.g., a UE). For example, the reporting may be in the form of assistance information sent by a UE and a base station may indicate the modulation order and/or the spreading factor for the UE based on the UE capability, such as the UE's PA characteristics. The smoothness of the UE's PA input-output characteristic, as described in connection with FIG. 4, may be used to estimate or dictate how much PAPR reduction is specified for a given waveform.

In another example, the switch point(s) for which a UE is to apply may be based on other parameters, such as based on the power headroom (PHR) and/or the transmission (Tx) power of the UE. For example, different threshold levels for PHR and/or Tx power may be defined or specified for the UE. As such, if the Tx power of the UE is above a Tx power threshold level or its PHR is below a PHR threshold level, the UE may switch to a setting of a low/lower PAPR waveform. For example, if an MCS entry of a table is set as q, such as shown by FIGS. 13 and 14, the UE may apply QPSK or $$\frac{\pi}{2} - BPSK$$

based on the defined threshold(s).

In another aspect of the present disclosure, a receiver (e.g., a base station) may indicate one or more spreading factors to a transmitter (e.g., a UE) for reducing the PAPR of a transmission from the transmitter. This may be accompanied by configuring the number of taps and/or the amplitude of each tap (more generally the impulse response) of a filter or may be based on the spreading factor itself. For example, as shown by a diagram 1500 of FIG. 15, each entry of an MCS table may be associated with an SF, where the SF may be indicated dynamically (e.g., via DCI) or may be configured semi-statically (e.g., via MAC-CE or RRC). Similar to the setting of MCS switching points, a suitable spreading factor value may be provided by the UE as an assistance information.

In some examples, a transmitter (e.g., a UE) may have the capability to select or set the spreading factor. In such cases, the value of the spreading factor may be reported to a receiver (e.g., a base station). The transmitter may also indicate more than one spreading factor, such as a list of suitable spreading factors (e.g., 1 to 3). The indication of the spreading factor from the transmitter may enable the receiver to exploit the repetition structure to perform better detection. In another example, for each given spreading factor, there might be specifications defined on the frequency flatness of a N-point combined channel, e.g., the frequency response of the waveform when the filters are applied. This may ensure that the receiver is able to perform equalization appropriately.

In another aspect of the present disclosure, the spreading and/or pulse shaping framework described in connection with FIGS. 8, 9A, 9B, and 10 may be based on configurable spreading/pulse shaping filters. In other words, it may be possible to introduce the overall spreading/pulse shaping framework, but keeping the exact RSMA pulse shaping filter configurable, such as via RRC signaling. For example, the configuration may include the number of taps for the time-domain filter or its frequency domain representation instead of the spreading factor and/or the amplitude of the spreading, etc. Such configuration may enable future updates of a waveform if a better waveform is identified, such as by a machine learning (ML) module or a computer search, or where different types of equalizers (e.g., linear or non-linear) are configured.

In one example, if ML is used, the ML (e.g., the ML training and/or the ML inference associated with the ML) may be performed at the transmitter (e.g., a UE) or at the receiver (e.g., a base station). An "ML inference" may refer to a process of running data points into an ML model (e.g., via an inference host) to calculate an output such as a single numerical score, e.g., to use a trained ML algorithm to make a prediction. An "inference host" or an "ML inference host" may refer to a network function which hosts the ML model during an inference mode. On the other hand, "ML training" may refer to a process of running data points to train or teach an ML model (e.g., via a training host). A "training host" or an "ML training host" may refer to a network function which hosts the ML model during a training mode. For example, inputs for the ML training may include the UE and/or base station capability (e.g., the type of equalizer), characteristics of the channel (e.g., delay spread that indicates the severity of inter-symbol interference (ISI)), the waveform used (e.g., DFT-S or OFDM), UE power (Tx power and/or PHR), frequency flatness conditions, accepted BW expansion, etc., and the output (e.g., the ML inference) may be the setting of pulse shaping and spreading.

Figure 16:
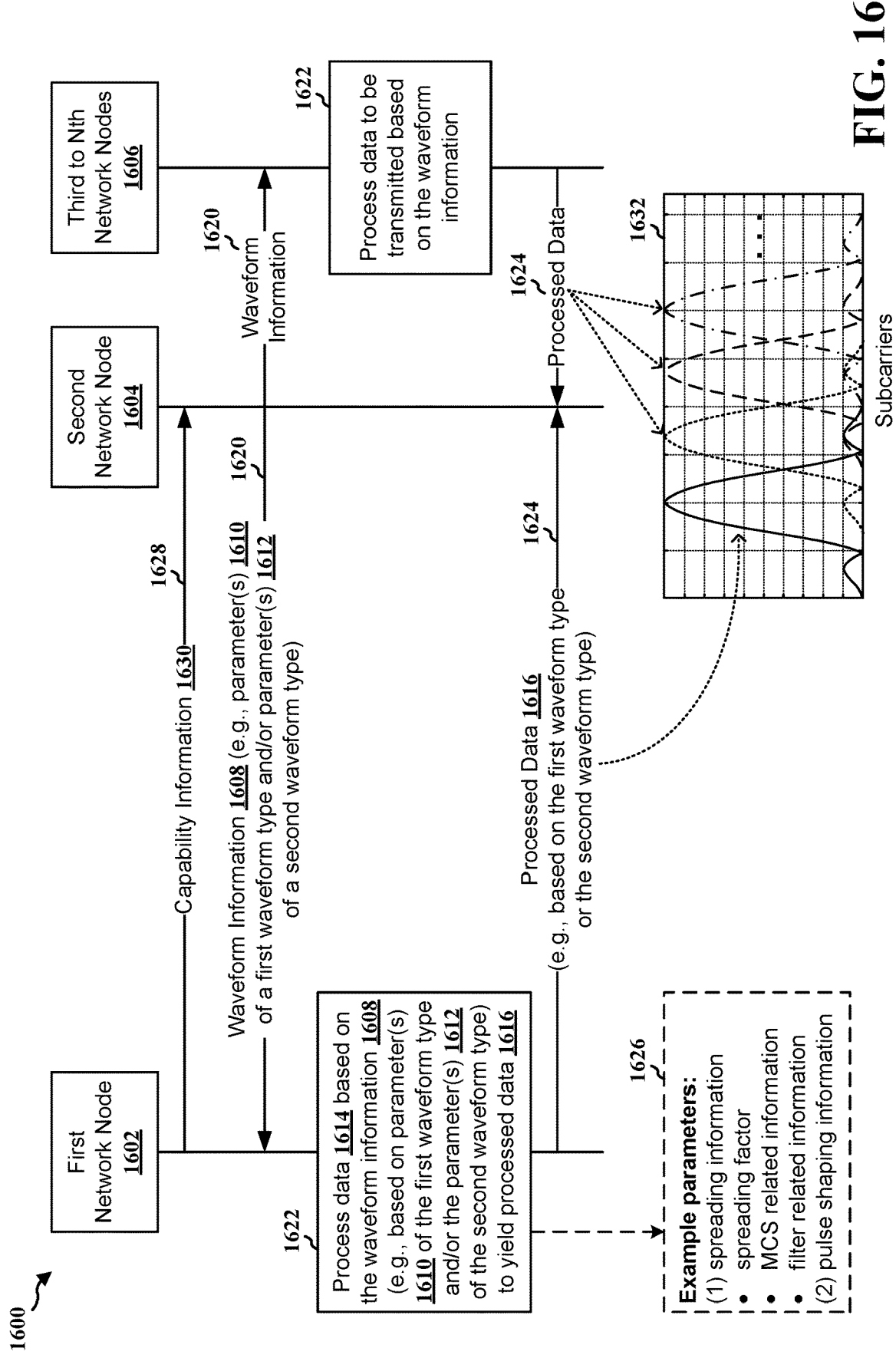
FIG. 16 is a communication flow illustrating an example of configuring resource spreading, pulse shaping, and/or MCS for a plurality of transmitters in accordance with various aspects of the present disclosure.

FIG. 16 is a communication flow 1600 illustrating an example of configuring resource spreading, pulse shaping, and/or MCS for a plurality of transmitters in accordance with various aspects of the present disclosure. The numberings associated with the communication flow 1600 do not specify a particular temporal order and are merely used as references for the communication flow 1600. Aspects presented herein may provide a low PAPR waveform design based on resource spreading, pulse shaping, and dynamic MCS configuration, such that a transmitting wireless device may set the IBO of its PA closer to the saturation point of the PA to enhance the PA efficiency.

As shown at 1620, a second network node 1604 (e.g., a base station, a component of the base station, or a second sidelink device, etc.) may transmit (or configure) waveform information to at least one network node, such as to a first network node 1602 (e.g., a UE, a component of the UE, a first sidelink device, etc.) and third to $N^{th}$ network nodes 1606 (e.g., UEs, components of the UEs, or third to $N^{th}$ sidelink devices, etc.). The waveform information may include one or more parameters associated with a first waveform type or one or more parameters associated with a second waveform type. The first waveform type and/or the second waveform type may include a variety of waveform types, such as OFDM, CP-OFDM, DFT-s-OFDM, etc.

For example, at 1620, the second network node 1604 may transmit waveform information 1608 to the first network node 1602, where the waveform information 1608 may include one or more parameters 1610 associated with a first waveform type or one or more parameters 1612 associated with a second waveform type. The second network node 1604 may transmit the waveform information to the first network node 1602 and the $N^{th}$ network nodes 1606 via DCI, RRC signaling, and/or a MAC-CE.

In one example, the waveform information configured for the first network node 1602 and/or the third to $N^{th}$ network nodes 1606 may be based on the capability of the first network node 1602 and/or the third to $N^{th}$ network nodes 1606. For example, as shown at 1628, the first network node 1602 may transmit capability information 1630 to the second network node 1604. In response, the second network node 1604 may configure the waveform information 1608 (e.g., the one or more parameters 1610 and/or the one or more parameters 1612) based on the capability information 1630.

At 1622, the first network node 1602 and the $N^{th}$ network nodes 1606 may process data to be transmitted to the second network node 1604 based on the waveform information 1608, which may result in a set of process data. The data may include data symbols, demodulation reference signal (DMRS) symbols, or a combination thereof. For example, the first network node 1602 may process data 1614 that is to be transmitted to the second network node 1604 based on the one or more parameters 1610 associated with a first waveform type or the one or more parameters 1612 associated with a second waveform, which may result in a processed data 1616.

In one example, as shown at 1626, the one or more parameters 1610 and/or the one or more parameters 1612 may include spreading information, such as a spreading factor for a resource spreading. As such, at 1622, the first network node 1602 and the $N^{th}$ network nodes 1606 may apply spreading to the data to be transmitted to the second network node 1604 based on the spreading factor, such as described in connection with FIGS. 8, 9A, 11A, and 11B. For example, the first network node 1602 may apply spreading to the data 1614 which may correspond to a set of resources (e.g., X subcarriers, X resource blocks (RBs), etc.), such that the data 1614 is being spread based on the spreading factor (e.g., SF=N). The amount of resources to be used by the processed data 1616 may be based on the spreading factor (e.g., number of subcarriers/RBs for the processed data 1616=X*N subcarriers/RBs).

In another example, the spreading information may be associated with an MCS index value, a modulation order, a target code rate, a spectral efficiency, or a combination thereof, such as described in connection with FIGS. 14 and 15. As such, values for the MCS index value, the modulation order, the target code rate, and/or the spectral efficiency may be selected/configured based on the spreading factor.

In another example, as described in connection with FIG. 8, the spreading information may be associated with one or more filters to be applied to the data 1614, a number of filters to be applied on the data 1614, one or more filter taps to be applied to the data 1614, one or more coefficient values for the one or more filter taps, and/or an amplitude (e.g., for amplitude shaping or amplitude of the spreading), etc.

In another example, as described in connection with FIG. 9A, the one or more parameters 1610 and/or the one or more parameters 1612 may further include pulse shaping information. As such, the first network node 1602 and the $N^{th}$ network nodes 1606 may apply pulse shaping to the data to be transmitted to the second network node 1604 based on the pulse shaping information.

At 1624, the first network node 1602 and the $N^{th}$ network nodes 1606 may transmit the processed data to the second network node 1604 (e.g., simultaneously or close in time), such as based on the first waveform type or the second waveform type. For example, the first network node 1602 may transmit a waveform based on the processed data 1616, where the waveform is the first waveform type or the second waveform type, etc. In one example, as shown at 1632, and also described in connection with FIG. 10, the second network node 1604 may receive the processed data 1616 from the first network node 1602 on a set of subcarriers, where the processed data 1616 may be processed in accordance with the waveform information 1608. Similarly, the second network node may receive processed data from the third to $N^{th}$ network nodes 1606 that are processed in accordance with their corresponding waveform information, and the processed data of the third to $N^{th}$ network nodes 1606 may occupy other sets of subcarriers, such that the sets of subcarriers occupied by the first network node 1602 and the third to $N^{th}$ network nodes 1606 may partially overlap with each other. In one example, the processed data may be transmitted via PUSCH, PDSCH, or PSSCH, etc.

Figure 17:
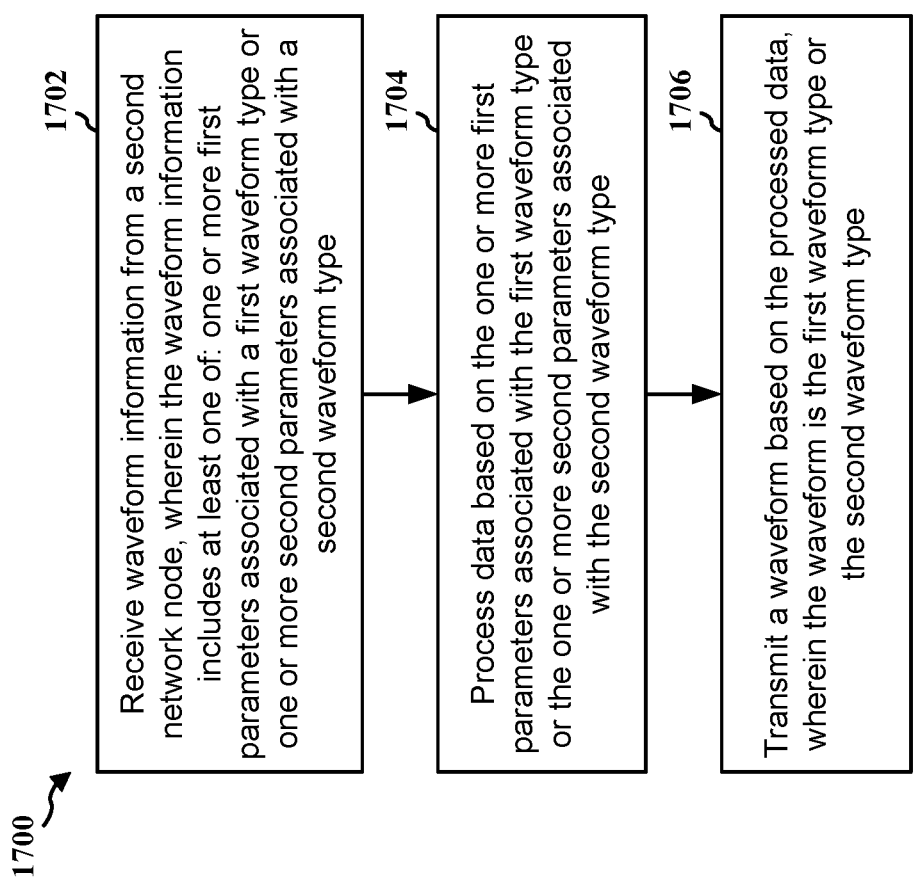
FIG. 17 is a flowchart of a method of wireless communication.

FIG. 17 is a flowchart 1700 of a method of wireless communication. The method may be performed by a first network node (e.g., the UE 104; the first network node 1602; the apparatus 1804). The method may enable the first network node to apply one or more parameters associated with a waveform to a transmission to reduce PAPR of the transmission.

At 1702, the first network node may receive waveform information from a second network node, where the waveform information includes at least one of: one or more first parameters associated with a first waveform type or one or more second parameters associated with a second waveform type, such as described in connection with FIG. 16. For example, at 1620, the first network node 1602 may receive waveform information 1608 from the second network node 1604, where the waveform information 1608 includes one or more parameters 1610 associated with a first waveform type or one or more parameters 1612 associated with a second waveform type. The reception of the waveform information may be performed by, e.g., the waveform configuration process component 198, the cellular base band processor 1824, and/or the transceiver(s) 1822 of the apparatus 1804 in FIG. 18.

In one example, to receive the waveform information from the second network node, the first network node may receive the waveform in at least one of: DCI, RRC signaling, or a MAC-CE.

In another example, the first network node may transmit capability information of the first network node to the second network node, where the waveform information is based on the capability information of the first network node.

In another example, the first network node corresponds to a UE or a component of the UE, and the second network node corresponds to a base station or one or more components of the base station.

At 1704, the first network node may process data based on the one or more first parameters associated with the first waveform type or the one or more second parameters associated with the second waveform type, such as described in connection with FIG. 16. For example, at 1622, the first network node 1602 may process data 1614 based on the one or more parameters 1610 associated with the first waveform type or the one or more parameters 1612 associated with the second waveform type. The process of the data may be performed by, e.g., the waveform configuration process component 198, the application processor 1806, and/or the cellular base band processor 1824 of the apparatus 1804 in FIG. 18.

In one example, the one or more first parameters or the one or more second parameters includes spreading information. In such an example, the spreading information includes an SF. In such an example, to process the data based on the one or more first parameters associated with the first waveform type or the one or more second parameters associated with the second waveform type, the first network node may apply spreading to the data based on the SF. In such an example, the spreading applied to the data may correspond to a set of resources, and to transmit the waveform based on the processed data, the first network node may transmit the waveform on one or more subcarriers of the set of resources, where an amount of the one or more subcarriers is based on the SF.

In another example, the spreading information is associated with at least one of: an MCS index value, a modulation order, a target code rate, or a spectral efficiency. In such an example, the MCS index value, the modulation order, the target code rate, or the spectral efficiency may be based on the SF.

In another example, the spreading information is associated with at least one of: one or more filters to be applied to the data, a number of filters to be applied on the data, one or more filter taps to be applied to the data, one or more coefficient values for the one or more filter taps, or an amplitude.

In another, the one or more first parameters or the one or more second parameters include pulse shaping information. In such an example, to process the data based on the one or more first parameters associated with the first waveform type or the one or more second parameters associated with the second waveform type, the first network node may apply pulse shaping to the data based on the pulse shaping information.

In another example, the data includes data symbols, demodulation reference signal, or a combination thereof.

At 1706, the first network node may transmit a waveform based on the processed data, where the waveform is the first waveform type or the second waveform type, such as described in connection with FIG. 16. For example, at 1624, the first network node 1602 may transmit a waveform based on the processed data 1616, where the waveform is the first waveform type or the second waveform type. The transmission of the waveform based on the processed data may be performed by, e.g., the waveform configuration process component 198, the cellular base band processor 1824, and/or the transceiver(s) 1822 of the apparatus 1804 in FIG. 18.

In one example, to transmit the waveform based on the processed data, the first network node may transmit the waveform on physical channels in uplink, downlink, and/or sidelink, (e.g., a PUSCH, a PDSCH, a PSSCH, etc.).

Figure 18:
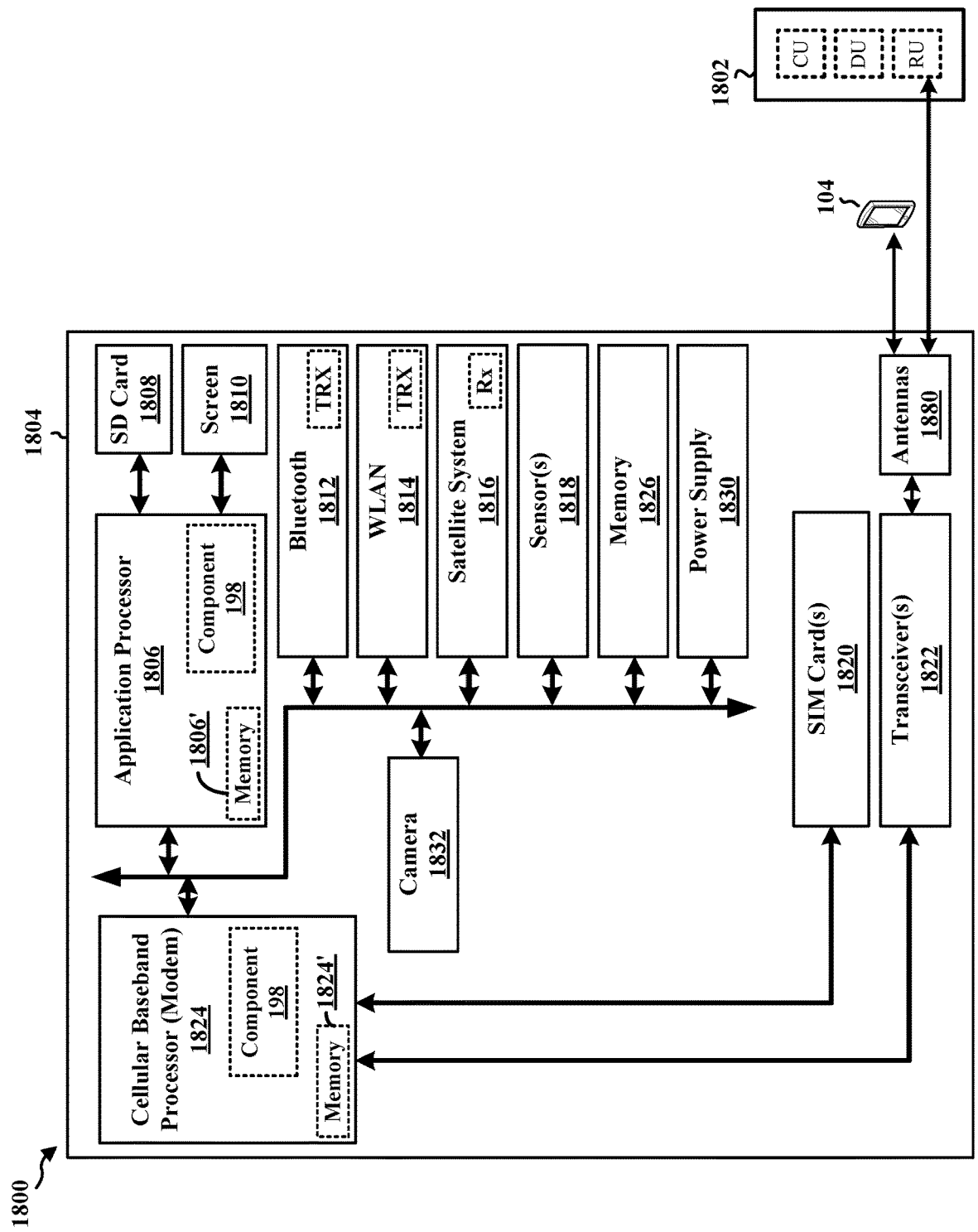
FIG. 18 is a diagram illustrating an example of a hardware implementation for an example apparatus and/or network entity.

FIG. 18 is a diagram 1800 illustrating an example of a hardware implementation for an apparatus 1804. The apparatus 1804 may be a UE, a component of a UE, or may implement UE functionality. In some aspects, the apparatus 1804 may include a cellular baseband processor 1824 (also referred to as a modem) coupled to one or more transceivers 1822 (e.g., cellular RF transceiver). The cellular baseband processor 1824 may include on-chip memory 1824'. In some aspects, the apparatus 1804 may further include one or more subscriber identity modules (SIM) cards 1820 and an application processor 1806 coupled to a secure digital (SD) card 1808 and a screen 1810. The application processor 1806 may include on-chip memory 1806'. In some aspects, the apparatus 1804 may further include a Bluetooth module 1812, a WLAN module 1814, a satellite system module 1816 (e.g., GNSS module), one or more sensor modules 1818 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1826, a power supply 1830, and/or a camera 1832. The Bluetooth module 1812, the WLAN module 1814, and the satellite system module 1816 may include an on-chip transceiver (TRX)/receiver (RX). The cellular baseband processor 1824 communicates through the transceiver(s) 1822 via one or more antennas 1880 with the UE 104 and/or with an RU associated with a network entity 1802. The cellular baseband processor 1824 and the application processor 1806 may each include a computer-readable medium/memory 1824', 1806', respectively. The additional memory modules 1826 may also be considered a computer-readable medium/memory. Each computer-readable medium/memory 1824', 1806', memory module 1826 may be non-transitory. The cellular baseband processor 1824 and the application processor 1806 are each responsible for general processing, including the execution of software stored on the computer-readable medium/memory. The software, when executed by the cellular baseband processor 1824/application processor 1806, causes the cellular baseband processor 1824/application processor 1806 to perform the various functions described supra. The computer-readable medium/memory may also be used for storing data that is manipulated by the cellular baseband processor 1824/application processor 1806 when executing software. The cellular baseband processor 1824/application processor 1806 may be a component of the UE 350 and may include the memory 360 and/or at least one of the TX processor 368, the RX processor 356, and the controller/processor 359. In one configuration, the apparatus 1804 may be a processor chip (modem and/or application) and include just the cellular baseband processor 1824 and/or the application processor 1806, and in another configuration, the apparatus 1804 may be the entire UE (e.g., see 350 of FIG. 3) and include the additional modules of the apparatus 1804.

As discussed supra, the waveform configuration process component 198 is configured to receive waveform information from a second network node, where the waveform information includes at least one of: one or more first parameters associated with a first waveform type or one or more second parameters associated with a second waveform type; process data based on the one or more first parameters associated with the first waveform type or the one or more second parameters associated with the second waveform type; and transmit a waveform based on the processed data, where the waveform is the first waveform type or the second waveform type. The waveform configuration process component 198 may be within the cellular baseband processor 1824, the application processor 1806, or both the cellular baseband processor 1824 and the application processor 1806. The waveform configuration process component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1804 may include a variety of components configured for various functions. In one configuration, the apparatus 1804, and in particular the cellular baseband processor 1824 and/or the application processor 1806, includes means for receiving waveform information from a second network node, where the waveform information includes at least one of: one or more first parameters associated with a first waveform type or one or more second parameters associated with a second waveform type; means for processing data based on the one or more first parameters associated with the first waveform type or the one or more second parameters associated with the second waveform type; means for transmitting a waveform based on the processed data, where the waveform is the first waveform type or the second waveform type; means for applying spreading to the data based on the SF; means for transmitting the waveform on physical channels in uplink, downlink, or sidelink; means for applying pulse shaping to the data based on the pulse shaping information; means for receiving the waveform in at least one of: DCI, RRC signaling, or a MAC-CE; means for transmitting capability information of the first network node to the second network node, where the waveform information is based on the capability information of the first network node. The means may be the waveform configuration process component 198 of the apparatus 1804 configured to perform the functions recited by the means. As described supra, the apparatus 1804 may include the TX processor 368, the RX processor 356, and the controller/processor 359. As such, in one configuration, the means may be the TX processor 368, the RX processor 356, and/or the controller/processor 359 configured to perform the functions recited by the means.

Figure 19:
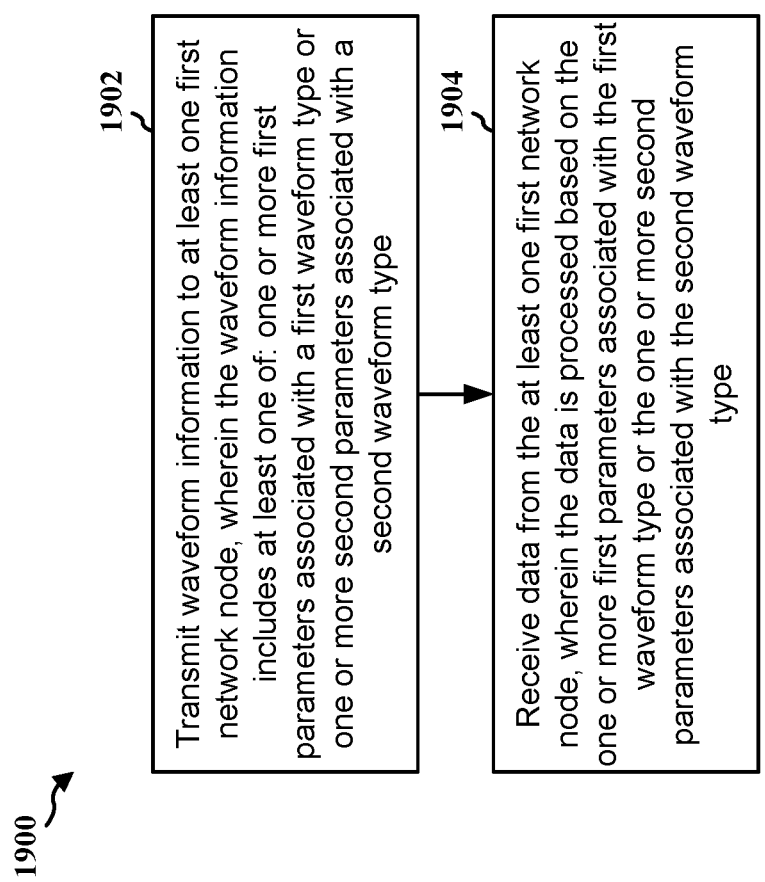
FIG. 19 is a flowchart of a method of wireless communication.

FIG. 19 is a flowchart 1900 of a method of wireless communication. The method may be performed by a second network node (e.g., the base station 102; the second network node 1604; the network entity 2002). The method may enable the second network node to configure waveforms for multiple transmitters and to receive signals from the multiple transmitters that are at least partially overlap with each other.

At 1902, the second network node may transmit waveform information to at least one first network node, where the waveform information includes at least one of: one or more first parameters associated with a first waveform type or one or more second parameters associated with a second waveform type, such as described in connection with FIG. 16. For example, at 1620, the second network node 1604 may transmit waveform information 1608 to the first network node 1602 and the third to $N^{th}$ network nodes 1606, where the waveform information 1608 includes one or more parameters 1610 associated with a first waveform type or one or more parameters 1612 associated with a second waveform type. The transmission of the waveform information may be performed by, e.g., the waveform configuration indication component 199 and/or the transceiver(s) 2046 of the network entity 2002 in FIG. 20.

In one example, the one or more first parameters or the one or more second parameters includes spreading information. In such an example, the spreading information includes an SF.

In another example, the spreading information is associated with at least one of: an MCS index value, a modulation order, a target code rate, or a spectral efficiency. In such an example, the MCS index value, the modulation order, the target code rate, or the spectral efficiency is based on the SF.

In another example, the spreading information is associated with at least one of: one or more filters to be applied to the data, one or more filter taps to be applied to the data, one or more coefficient values for the one or more filter taps, or an amplitude.

In another example, the one or more first parameters or the one or more second parameters include pulse shaping information.

In another example, the waveform information is transmitted via at least one of: DCI, RRC signaling, or a MAC-CE.

In another example, the second network node may receive capability information from the at least one first network node, where the waveform information is based on the capability information of the at least one first network node.

In another example, each first network node of the at least one first network node corresponds to a UE or a component of the UE, and the second network node corresponds to a base station or one or more components of the base station.

At 1904, the second network node may receive data from the at least one first network node, where the data is processed based on the one or more first parameters associated with the first waveform type or the one or more second parameters associated with the second waveform type, such as described in connection with FIG. 16. For example, at 1624, the second network node 1604 may receive processed data from the first network node 1602 and the third to $N^{th}$ network nodes 1606, where the processed data is processed based on the one or more parameters 1610 associated with the first waveform type or the one or more parameters 1612 associated with the second waveform type. The reception of the data may be performed by, e.g., the waveform configuration indication component 199 and/or the transceiver(s) 2046 of the network entity 2002 in FIG. 20.

In one example, the data is received via physical channels in uplink, downlink, or sidelink.

In another example, to receive the data from the at least one first network node, the second network node may receive a waveform based on the data, where the waveform is the first waveform type or the second waveform type.

In another example, the at least one first network node includes at least a first UE and a second UE, and to receive the data from the at least one first network node, the second network node may receive a first transmission from the first UE, the first transmission being processed in accordance with the waveform information, where the first uplink transmission is received on a first plurality of subcarriers, and the second network node may receive a second transmission from the second UE, the second transmission being processed in accordance with the waveform information, where the second uplink transmission is received on a second plurality of subcarriers, where the first plurality of subcarriers partially overlaps with the second plurality of subcarriers.

Figure 20:
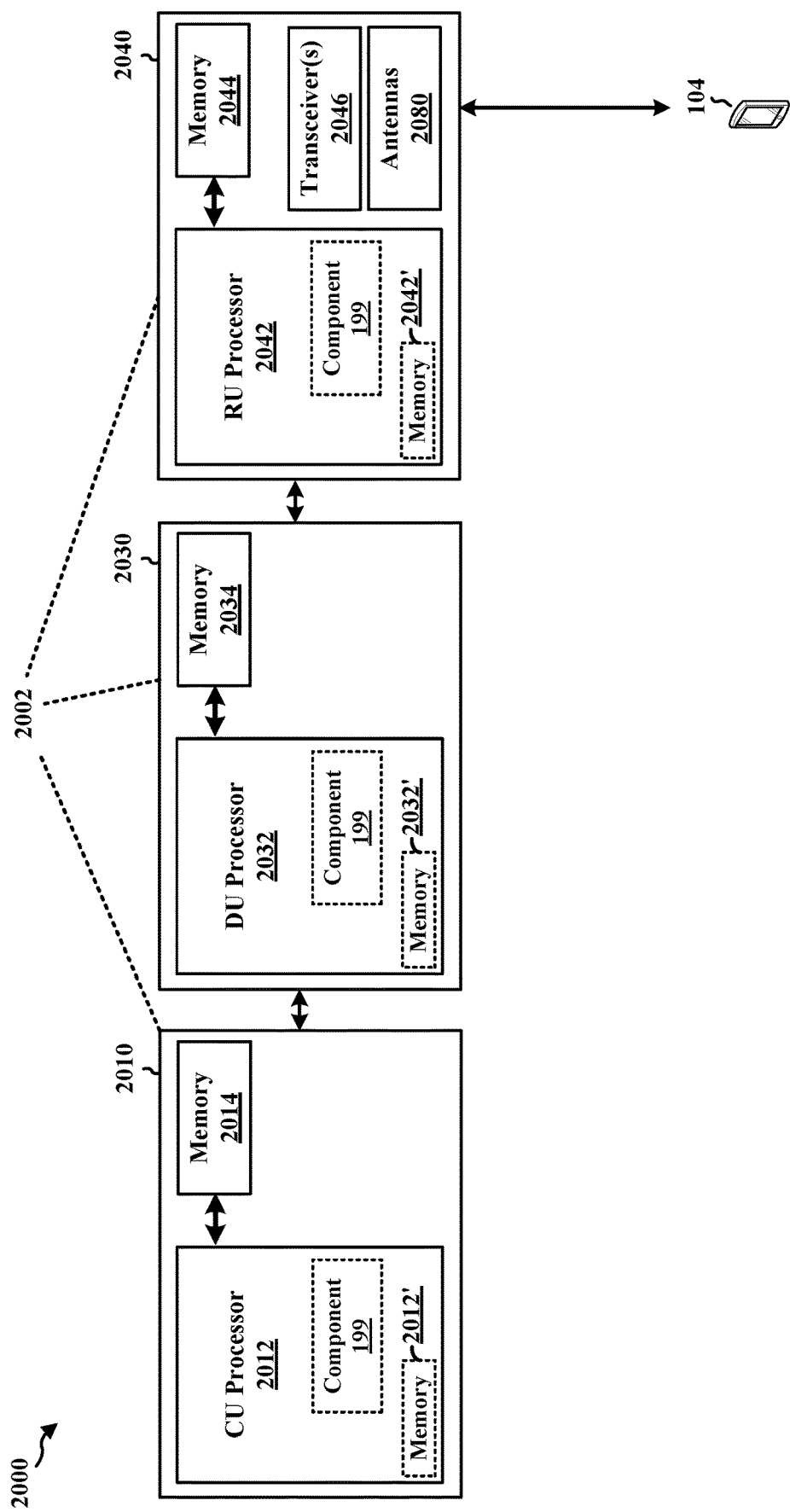
FIG. 20 is a diagram illustrating an example of a hardware implementation for an example network entity.

FIG. 20 is a diagram 2000 illustrating an example of a hardware implementation for a network entity 2002. The network entity 2002 may be a BS, a component of a BS, or may implement BS functionality. The network entity 2002 may include at least one of a CU 2010, a DU 2030, or an RU 2040. For example, based on the layer functionality handled by the component 199, the network entity 2002 may include the CU 2010; both the CU 2010 and the DU 2030; each of the CU 2010, the DU 2030, and the RU 2040; the DU 2030; both the DU 2030 and the RU 2040; or the RU 2040. The CU 2010 may include a CU processor 2012. The CU processor 2012 may include on-chip memory 2012'. In some aspects, the CU 2010 may further include additional memory modules 2014. The CU 2010 communicates with the DU 2030. The DU 2030 may include a DU processor 2032. The DU processor 2032 may include on-chip memory 2032'. In some aspects, the DU 2030 may further include additional memory modules 2034. The DU 2030 communicates with the RU 2040. The RU 2040 may include an RU processor 2042. The RU processor 2042 may include on-chip memory 2042'. In some aspects, the RU 2040 may further include additional memory modules 2044, one or more transceivers 2046, and antennas 2080. The RU 2040 communicates with the UE 104. The on-chip memory 2012', 2032', 2042' and the additional memory modules 2014, 2034, 2044 may each be considered a computer-readable medium/memory. Each computer-readable medium/memory may be non-transitory. Each of the processors 2012, 2032, 2042 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit waveform information to at least one first network node, where the waveform information includes at least one of: one or more first parameters associated with a first waveform type or one or more second parameters associated with a second waveform type; and receive data from the at least one first network node, where the data is processed based on the one or more first parameters associated with the first waveform type or the one or more second parameters associated with the second waveform type. The component 199 may be within one or more processors of one or more of the CU 2010, DU 2030, and the RU 2040. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2002 may include a variety of components configured for various functions. In one configuration, the network entity 2002 includes means for transmitting waveform information to at least one first network node, where the waveform information includes at least one of: one or more first parameters associated with a first waveform type or one or more second parameters associated with a second waveform type; means for receiving data from the at least one first network node, where the data is processed based on the one or more first parameters associated with the first waveform type or the one or more second parameters associated with the second waveform type; means for receiving capability information from the at least one first network node, where the waveform information is based on the capability information of the at least one first network node; means for receiving a waveform based on the data, where the waveform is the first waveform type or the second waveform type; means for receiving a first transmission from the first UE, the first transmission being processed in accordance with the waveform information, where the first uplink transmission is received on a first plurality of subcarriers; and means for receiving a second transmission from the second UE, the second transmission being processed in accordance with the waveform information, where the second uplink transmission is received on a second plurality of subcarriers, where the first plurality of subcarriers partially overlaps with the second plurality of subcarriers. The means may be the component 199 of the network entity 2002 configured to perform the functions recited by the means. As described supra, the network entity 2002 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is an apparatus for wireless communication including: a memory; and at least one processor coupled to the memory and configured to: receive waveform information from a second network node, where the waveform information includes at least one of: one or more first parameters associated with a first waveform type or one or more second parameters associated with a second waveform type; process data based on the one or more first parameters associated with the first waveform type or the one or more second parameters associated with the second waveform type; and transmit a waveform based on the processed data, where the waveform is the first waveform type or the second waveform type.

Aspect 2 is the apparatus of aspect 1, where the one or more first parameters or the one or more second parameters includes spreading information.

Aspect 3 is the apparatus of any of aspects 1 and 2, where the spreading information includes an SF.

Aspect 4 is the apparatus of any of aspects 1 to 3, where to process the data based on the one or more first parameters associated with the first waveform type or the one or more second parameters associated with the second waveform type, the at least one processor is configured to: apply spreading to the data based on the SF.

Aspect 5 is the apparatus of any of aspects 1 to 4, where the spreading applied to the data corresponds to a set of resources, and where, to transmit the waveform based on the processed data, the at least one processor is configured to transmit the waveform on one or more subcarriers of the set of resources, where an amount of the one or more subcarriers is based on the SF.

Aspect 6 is the apparatus of any of aspects 1 to 5, where the spreading information is associated with at least one of: an MCS index value, a modulation order, a target code rate, or a spectral efficiency.

Aspect 7 is the apparatus of any of aspects 1 to 6, where the MCS index value, the modulation order, the target code rate, or the spectral efficiency is based on the SF.

Aspect 8 is the apparatus of any of aspects 1 to 7, where the spreading information is associated with at least one of: one or more filters to be applied to the data, a number of filters to be applied on the data, one or more filter taps to be applied to the data, one or more coefficient values for the one or more filter taps, or an amplitude.

Aspect 9 is the apparatus of any of aspects 1 to 8, where to transmit the waveform based on the processed data, the at least one processor is configured to transmit the waveform on physical channels in uplink, downlink, or sidelink.

Aspect 10 is the apparatus of any of aspects 1 to 9, where the one or more first parameters or the one or more second parameters include pulse shaping information.

Aspect 11 is the apparatus of any of aspects 1 to 10, where, to process the data based on the one or more first parameters associated with the first waveform type or the one or more second parameters associated with the second waveform type, the at least one processor is configured to: apply pulse shaping to the data based on the pulse shaping information.

Aspect 12 is the apparatus of any of aspects 1 to 11, where, to receive the waveform information from the second network node, the at least one processor is configured to receive the waveform in at least one of: DCI, RRC signaling, or a MAC-CE.

Aspect 13 is the apparatus of any of aspects 1 to 12, where the at least one processor is further configured to: transmit capability information of the first network node to the second network node, where the waveform information is based on the capability information of the first network node.

Aspect 14 is the apparatus of any of aspects 1 to 13, where the first network node corresponds to a UE or a component of the UE, and the second network node corresponds to a base station or one or more components of the base station.

Aspect 15 is the apparatus of any of aspects 1 to 14, where the data includes data symbols, demodulation reference signal, or a combination thereof.

Aspect 16 is the apparatus of any of aspects 1 to 15 further including at least one of a transceiver or an antenna coupled to the at least one processor.

Aspect 17 is a method of wireless communication for implementing any of aspects 1 to 16.

Aspect 18 is an apparatus for wireless communication including means for implementing any of aspects 1 to 16.

Aspect 19 is a non-transitory computer-readable medium storing computer executable code, where the code when executed by a processor causes the processor to implement any of aspects 1 to 16.

Aspect 20 is an apparatus for wireless communication including: a memory; and at least one processor coupled to the memory and configured to: transmit waveform information to at least one first network node, where the waveform information includes at least one of: one or more first parameters associated with a first waveform type or one or more second parameters associated with a second waveform type; and receive data from the at least one first network node, where the data is processed based on the one or more first parameters associated with the first waveform type or the one or more second parameters associated with the second waveform type.

Aspect 21 is the apparatus of aspect 20, where the one or more first parameters or the one or more second parameters includes spreading information.

Aspect 22 is the apparatus of any of aspects 20 and 21, where the spreading information includes an SF.

Aspect 23 is the apparatus of any of aspects 20 and 22, where the spreading information is associated with at least one of: an MCS index value, a modulation order, a target code rate, or a spectral efficiency.

Aspect 24 is the apparatus of any of aspects 20 and 23, where the MCS index value, the modulation order, the target code rate, or the spectral efficiency is based on the SF.

Aspect 25 is the apparatus of any of aspects 20 and 24, where the spreading information is associated with at least one of: one or more filters to be applied to the data, one or more filter taps to be applied to the data, one or more coefficient values for the one or more filter taps, or an amplitude.

Aspect 26 is the apparatus of any of aspects 20 and 25, where the data is received via physical channels in uplink, downlink, or sidelink.

Aspect 27 is the apparatus of any of aspects 20 to 26, where the one or more first parameters or the one or more second parameters include pulse shaping information.

Aspect 28 is the apparatus of any of aspects 20 to 27, where the waveform information is transmitted via at least one of: DCI, RRC signaling, or a MAC-CE.

Aspect 29 is the apparatus of any of aspects 20 to 28, where the at least one processor is further configured to: receive capability information from the at least one first network node, where the waveform information is based on the capability information of the at least one first network node Aspect 30 is the apparatus of any of aspects 20 to 29, where each first network node of the at least one first network node corresponds to a UE or a component of the UE, and the second network node corresponds to a base station or one or more components of the base station.

Aspect 31 is the apparatus of any of aspects 20 to 30, where to receive the data from the at least one first network node, the at least one processor is configured to: receive a waveform based on the data, where the waveform is the first waveform type or the second waveform type.

Aspect 32 is the apparatus of any of aspects 20 to 31, where the at least one first network node includes at least a first UE and a second UE, and where to receive the data from the at least one first network node, the at least one processor is configured to: receive a first transmission from the first UE, the first transmission being processed in accordance with the waveform information, where the first uplink transmission is received on a first plurality of subcarriers; and receive a second transmission from the second UE, the second transmission being processed in accordance with the waveform information, where the second uplink transmission is received on a second plurality of subcarriers, where the first plurality of subcarriers partially overlaps with the second plurality of subcarriers.

Aspect 33 is the apparatus of any of aspects 20 to 32 further including at least one of a transceiver or an antenna coupled to the at least one processor.

Aspect 34 is a method of wireless communication for implementing any of aspects 20 to 33.

Aspect 35 is an apparatus for wireless communication including means for implementing any of aspects 20 to 33.

Aspect 36 is a non-transitory computer-readable medium storing computer executable code, where the code when executed by a processor causes the processor to implement any of aspects 20 to 33.

What is claimed is:

1. A first network node for wireless communication, comprising:
   memory; and
   at least one processor coupled to the memory, wherein the at least one processor is configured to:
     receive, from a second network node, waveform information for a waveform, wherein the waveform information includes at least one of: one or more first parameters associated with a first waveform type or one or more second parameters associated with a second waveform type, wherein the waveform information includes a spreading factor (SF) value, wherein the one or more first parameters or the one or more second parameters include the SF value associated with at least one of: a modulation and coding scheme (MCS) index value, a target code rate, or a spectral efficiency;
     process data based on the one or more first parameters associated with the first waveform type or the one or more second parameters associated with the second waveform type; and
     transmit the waveform based on the processed data, wherein the waveform is the first waveform type or the second waveform type and includes an SF based on the SF value indicated in the waveform information from the second network node.

2. The first network node of claim 1, wherein the one or more first parameters or the one or more second parameters includes spreading information.

3. The first network node of claim 2, wherein the spreading information is associated with at least one of: one or more filters to be applied to the data, a number of filters to be applied on the data, one or more filter taps to be applied to the data, one or more coefficient values for the one or more filter taps, or an amplitude.

4. The first network node of claim 1, wherein, to process the data based on the one or more first parameters associated with the first waveform type or the one or more second parameters associated with the second waveform type, the at least one processor is configured to:
   apply spreading to the data based on the SF value.

5. The first network node of claim 4, wherein the spreading applied to the data corresponds to a set of resources, and wherein, to transmit the waveform based on the processed data, the at least one processor is configured to transmit the waveform on one or more subcarriers of the set of resources, wherein an amount of the one or more subcarriers is based on the SF value.

6. The first network node of claim 1, wherein the MCS index value, the target code rate, or the spectral efficiency is based on the SF value.

7. The first network node of claim 1, wherein, to transmit the waveform based on the processed data, the at least one processor is configured to transmit the waveform on physical channels in uplink, downlink, or sidelink.

8. The first network node of claim 1, wherein the one or more first parameters or the one or more second parameters include pulse shaping information.

9. The first network node of claim 8, wherein, to process the data based on the one or more first parameters associated with the first waveform type or the one or more second parameters associated with the second waveform type, the at least one processor is configured to:
apply pulse shaping to the data based on the pulse shaping information.

10. The first network node of claim 1, wherein, to receive the waveform information from the second network node, the at least one processor is configured to receive the waveform in at least one of: downlink control information (DCI), radio resource control (RRC) signaling, or a medium access control (MAC) control element (CE) (MAC-CE).

11. The first network node of claim 1, wherein the at least one processor is further configured to:
transmit capability information of the first network node to the second network node, wherein the waveform information is based on the capability information of the first network node.

12. The first network node of claim 1, wherein the first network node corresponds to a user equipment (UE) or a component of the UE, and the second network node corresponds to a base station or one or more components of the base station.

13. The first network node of claim 1, wherein the data includes data symbols, demodulation reference signal (DMRS) symbols, or a combination thereof.

14. The first network node of claim 1, wherein the SF value is associated with at least the MCS index value.

15. The first network node of claim 14, wherein the MCS index value is based on the SF value.

16. The first network node of claim 1, wherein the SF value is further associated with at least a modulation order.

17. The first network node of claim 16, wherein the modulation order is based on the SF value.

18. The first network node of claim 1, wherein the SF value is associated with at least the target code rate.

19. The first network node of claim 18, wherein the target code rate is based on the SF value.

20. The first network node of claim 1, wherein the SF value is associated with at least the spectral efficiency.

21. The first network node of claim 20, wherein the spectral efficiency is based on the SF value.

22. The first network node of claim 1, wherein the at least one processor is further configured to:
receive a parameter setting that adjusts a switching point between different modulation orders of an MCS table, wherein the MCS index is interpreted based on the MCS table having the switching point indicated by the parameter setting.

23. The first network node of claim 1, wherein the at least one processor is further configured to:
receive a configuration for multiple MCS tables, each table of the multiple MCS tables having a different switching point between different modulation orders; and
receive an indication to use an MCS table from the multiple MCS tables, wherein the MCS index is interpreted based on the MCS table that the first network node is indicated to use.

24. A method of wireless communication performed by a first network node, comprising:
receiving, from a second network node, waveform information for a waveform, wherein the waveform information includes at least one of: one or more first parameters associated with a first waveform type or one or more second parameters associated with a second waveform type, wherein the waveform information includes a spreading factor (SF) value, wherein the one or more first parameters or the one or more second parameters include the SF value associated with at least one of: a modulation and coding scheme (MCS) index value, a target code rate, or a spectral efficiency;
processing data based on the one or more first parameters associated with the first waveform type or the one or more second parameters associated with the second waveform type; and
transmitting the waveform based on the processed data, wherein the waveform is the first waveform type or the second waveform type and includes an SF based on the SF value indicated in the waveform information from the second network node.

25. A second network node for wireless communication, comprising:
memory; and
at least one processor coupled to the memory, wherein the at least one processor is configured to:
transmit, to at least one first network node, waveform information for a waveform, wherein the waveform information includes at least one of: one or more first parameters associated with a first waveform type or one or more second parameters associated with a second waveform type, wherein the waveform information includes a spreading factor (SF) value, wherein the one or more first parameters or the one or more second parameters include the SF value associated with at least one of: a modulation and coding scheme (MCS) index value, a target code rate, or a spectral efficiency; and
receive the waveform that includes data from the at least one first network node, wherein the data is processed based on the one or more first parameters associated with the first waveform type or the one or more second parameters associated with the second waveform type and includes an SF based on the SF value indicated in the waveform information from the second network node.

26. The second network node of claim 25, wherein the one or more first parameters or the one or more second parameters includes spreading information.

27. The second network node of claim 26, wherein the spreading information is associated with at least one of: one or more filters to be applied to the data, one or more filter taps to be applied to the data, one or more coefficient values for the one or more filter taps, or an amplitude.

28. The second network node of claim 25, wherein the MCS index value, the target code rate, or the spectral efficiency is based on the SF value.

29. The second network node of claim 25, wherein the data is received via physical channels in uplink, downlink, or sidelink.

30. The second network node of claim 25, wherein the one or more first parameters or the one or more second parameters include pulse shaping information.

31. The second network node of claim 25, wherein the waveform information is transmitted via at least one of: downlink control information (DCI), radio resource control (RRC) signaling, or a medium access control (MAC) control element (CE) (MAC-CE).

32. The second network node of claim 25, wherein the at least one processor is further configured to:
receive capability information from the at least one first network node, wherein the waveform information is based on the capability information of the at least one first network node.

33. The second network node of claim 25, wherein each first network node of the at least one first network node corresponds to a user equipment (UE) or a component of the UE, and the second network node corresponds to a base station or one or more components of the base station.

34. The second network node of claim 25, wherein
the waveform is the first waveform type or the second waveform type.

35. The second network node of claim 25, wherein the at least one first network node includes at least a first user equipment (UE) and a second UE, and wherein to receive the data from the at least one first network node, the at least one processor is configured to:
receive a first transmission from the first UE, the first transmission being processed in accordance with the waveform information, wherein the first transmission is received on a first plurality of subcarriers; and
receive a second transmission from the second UE, the second transmission being processed in accordance with the waveform information, wherein the second transmission is received on a second plurality of subcarriers, wherein the first plurality of subcarriers partially overlaps with the second plurality of subcarriers.

36. The second network node of claim 25, wherein the at least one processor is further configured to:
transmit a parameter setting that adjusts a switching point between different modulation orders of an MCS table, wherein the MCS index is based on the MCS table having the switching point indicated by the parameter setting.

37. The second network node of claim 25, wherein the at least one processor is further configured to:
configure multiple MCS tables, each MSC table of the multiple MCS tables having a different switching point between different modulation orders; and
transmit an indication to use an MCS table from the multiple MCS tables, wherein the MCS index is based on the MCS table indicated by the indication.

38. A method of wireless communication performed by a second network node, comprising:
transmitting, to at least one first network node, waveform information for a waveform, wherein the waveform information includes at least one of: one or more first parameters associated with a first waveform type or one or more second parameters associated with a second waveform type, wherein the waveform information includes a spreading factor (SF) value, wherein the one or more first parameters or the one or more second parameters include the SF value associated with at least one of: a modulation and coding scheme (MCS) index value, a target code rate, or a spectral efficiency; and
receiving the waveform that includes data from the at least one first network node, wherein the data is processed based on the one or more first parameters associated with the first waveform type or the one or more second parameters associated with the second waveform type and includes an SF based on the SF value indicated in the waveform information from the second network node.

* * * * *